United States Patent
Hagiwara et al.

(10) Patent No.: US 10,072,553 B2
(45) Date of Patent: Sep. 11, 2018

(54) DETERIORATION DIAGNOSIS APPARATUS FOR SELECTIVE CATALYTIC REDUCTION CATALYST

(71) Applicant: TOYOTA JIDOSHA KABUSHIKI KAISHA, Toyota-shi, Aichi-ken (JP)

(72) Inventors: Koji Hagiwara, Susono (JP); Toru Kidokoro, Hadano (JP); Yasushi Iwazaki, Ebina (JP); Takahiko Fujiwara, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 53 days.

(21) Appl. No.: 15/375,800

(22) Filed: Dec. 12, 2016

(65) Prior Publication Data

US 2017/0167352 A1 Jun. 15, 2017

(30) Foreign Application Priority Data

Dec. 14, 2015 (JP) ................. 2015-243551

(51) Int. Cl.
*F01N 3/00* (2006.01)
*F01N 11/00* (2006.01)
(Continued)

(52) U.S. Cl.
CPC ........ *F01N 11/007* (2013.01); *B01D 53/9418* (2013.01); *B01D 53/9431* (2013.01);
(Continued)

(58) Field of Classification Search
CPC ............ B01D 53/9418; B01D 53/9431; B01D 53/9459; B01D 53/9495; F01N 11/002;
(Continued)

(56) References Cited

U.S. PATENT DOCUMENTS 9,297,289 B2 * 3/2016 Sakurai ................. F01N 3/2053
9,611,776 B2 4/2017 Hagiwara et al.
(Continued)

FOREIGN PATENT DOCUMENTS

JP 2004285840 A 10/2004
JP 2008128213 A 6/2008
(Continued)

OTHER PUBLICATIONS

United States Patent and Trademark Office, Non-Final Rejection of U.S. Appl. No. 15/200,327, dated Dec. 29, 2017, 14 pages.
(Continued)

*Primary Examiner* — Mark Laurenzi
*Assistant Examiner* — Anthony Ayala Delgado
(74) *Attorney, Agent, or Firm* — Hunton Andrews Kurth LLP

(57) ABSTRACT

In a deterioration diagnosis apparatus for a selective catalytic reduction (SCR) catalyst in which when an air fuel ratio of a mixture to be combusted in an internal combustion engine is a lean air fuel ratio, inducement processing is executed which is to induce a water gas shift reaction in a pre-stage catalyst, by changing the air fuel ratio of the mixture from the lean air fuel ratio to a predetermined rich air fuel ratio, and diagnosis processing is executed which is to diagnose deterioration of the SCR catalyst based on an output difference between two air fuel ratio sensors at the time of the execution of the inducement processing, when the SCR catalyst is in a state of being subjected to sulfur poisoning resulting from the execution of the S purge processing of the pre-stage catalyst, diagnosis processing is not executed.

9 Claims, 9 Drawing Sheets

(51) Int. Cl.
*F01N 13/00* (2010.01)
*B01D 53/94* (2006.01)
*F01N 3/08* (2006.01)
*F01N 3/10* (2006.01)
*F01N 3/20* (2006.01)
*F02D 41/02* (2006.01)

(52) U.S. Cl.
CPC ..... *B01D 53/9459* (2013.01); *B01D 53/9495* (2013.01); *F01N 3/085* (2013.01); *F01N 3/105* (2013.01); *F01N 3/208* (2013.01); *F01N 3/2066* (2013.01); *F01N 3/2073* (2013.01); *F01N 11/002* (2013.01); *F01N 13/009* (2014.06); *F02D 41/027* (2013.01); *F02D 41/0235* (2013.01); *F01N 2550/02* (2013.01); *F01N 2560/025* (2013.01); *F01N 2570/04* (2013.01); *F01N 2900/0416* (2013.01); *F01N 2900/0418* (2013.01); *F01N 2900/1402* (2013.01); *F01N 2900/1404* (2013.01); *F02D 2200/0802* (2013.01); *Y02T 10/24* (2013.01); *Y02T 10/47* (2013.01)

(58) Field of Classification Search
CPC .. F01N 11/007; F01N 13/009; F01N 2550/02; F01N 2560/025; F01N 2570/04; F01N 2900/0416; F01N 2900/0418; F01N 2900/1402

See application file for complete search history.

(56) References Cited

U.S. PATENT DOCUMENTS

| | | | |
|---|---|---|---|
| 9,617,900 B2 * | 4/2017 | Hagiwara | F01N 13/009 |
| 2013/0152552 A1 * | 6/2013 | Sakurai | F01N 3/0842 60/285 |
| 2017/0009626 A1 | 1/2017 | Hagiwara et al. | |
| 2017/0138245 A1 | 5/2017 | Hagiwara et al. | |

FOREIGN PATENT DOCUMENTS

| | | |
|---|---|---|
| JP | 2012241652 A | 12/2012 |
| JP | 2016-008510 A | 1/2016 |
| WO | 2015/194155 A1 | 12/2015 |

OTHER PUBLICATIONS

United States Patent and Trademark Office, Notice of Allowance issued in U.S. Appl. No. 15/200,327, dated Jun. 5, 2018, 8 pages.

* cited by examiner

[Fig. 1]
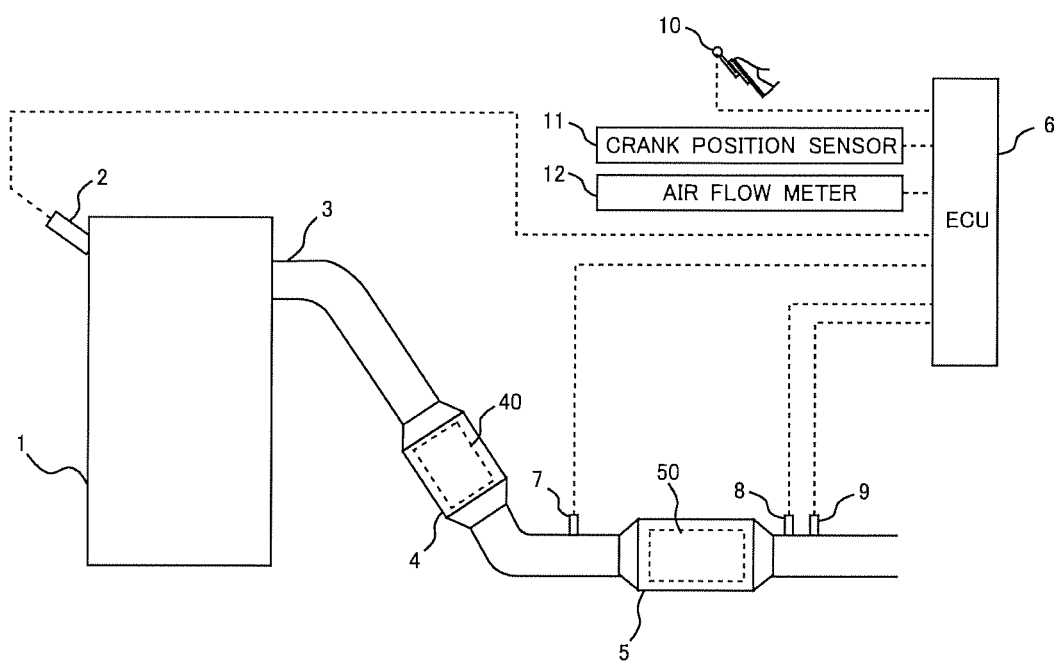

[Fig. 2]
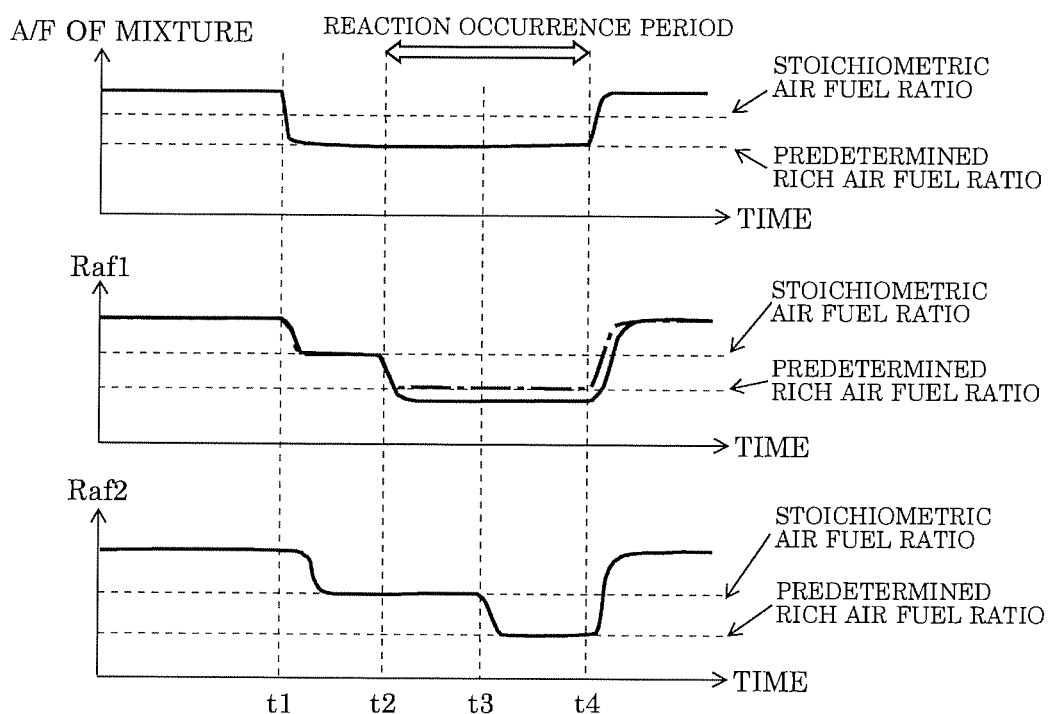

[Fig. 3]
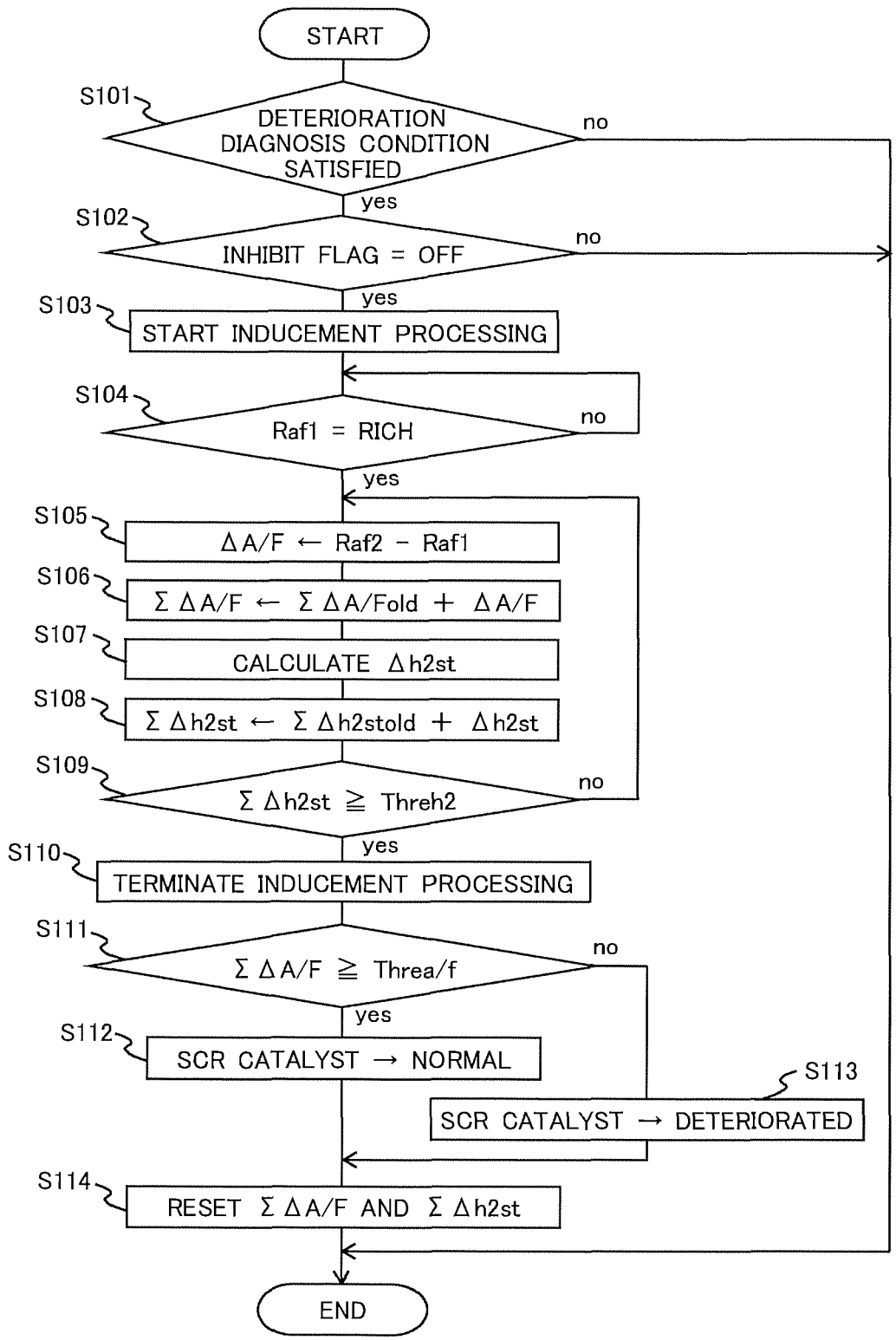

[Fig. 4]
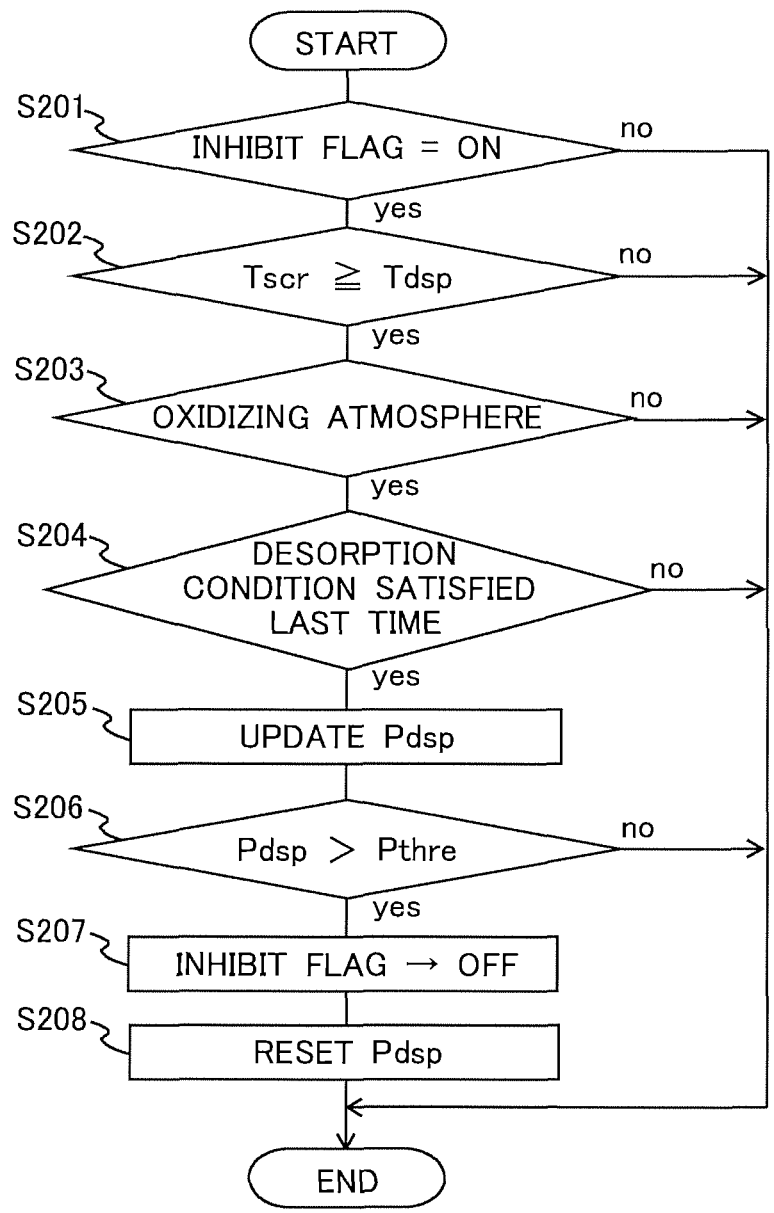

[Fig. 5]
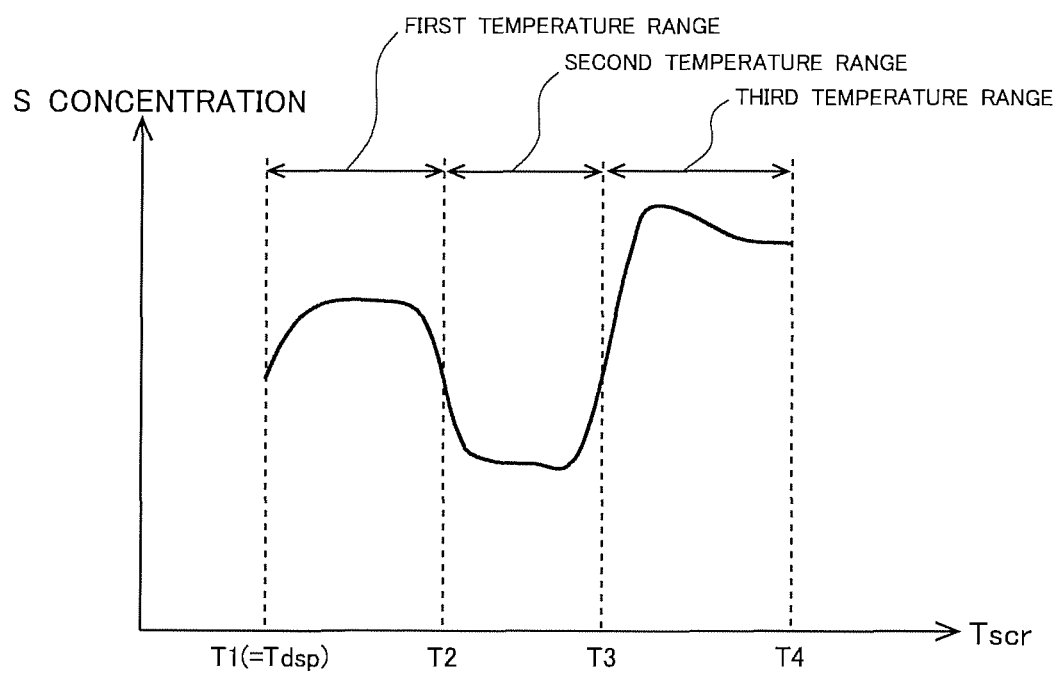

[Fig. 6]
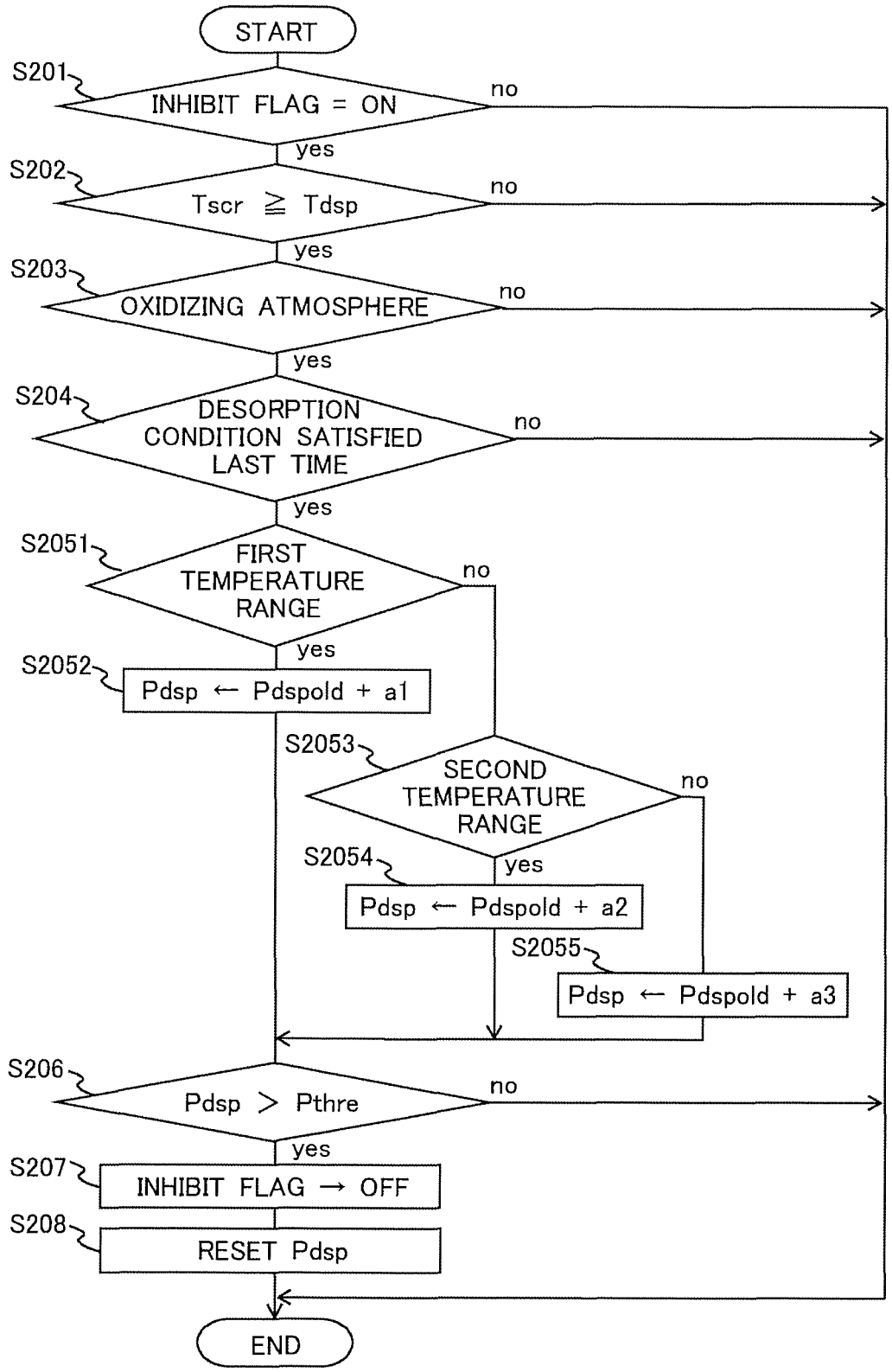

[Fig. 7]
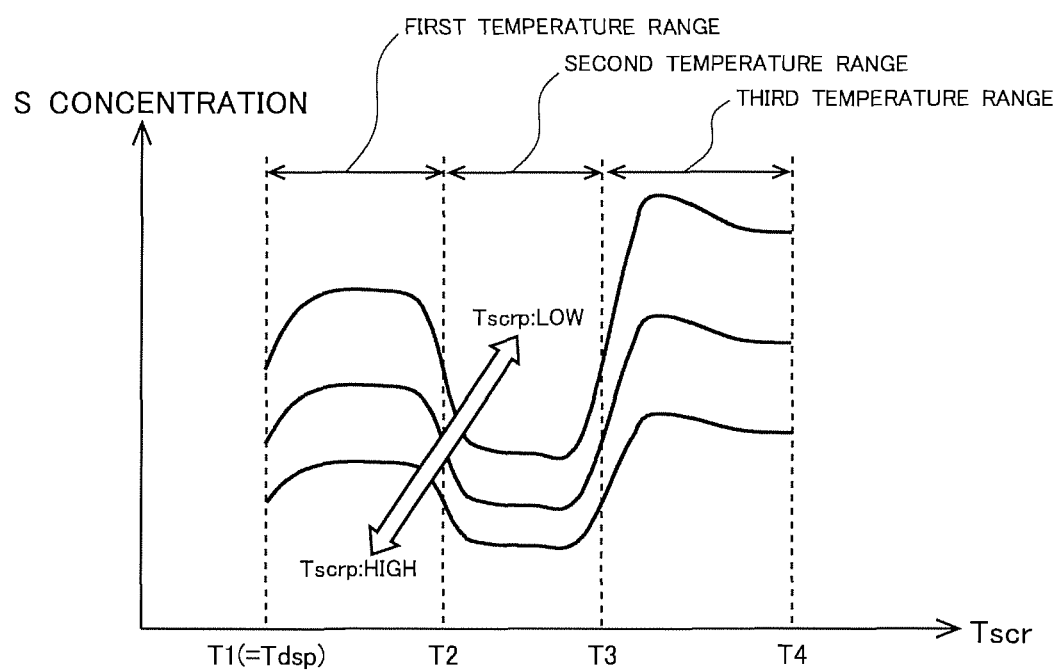

[Fig. 8]
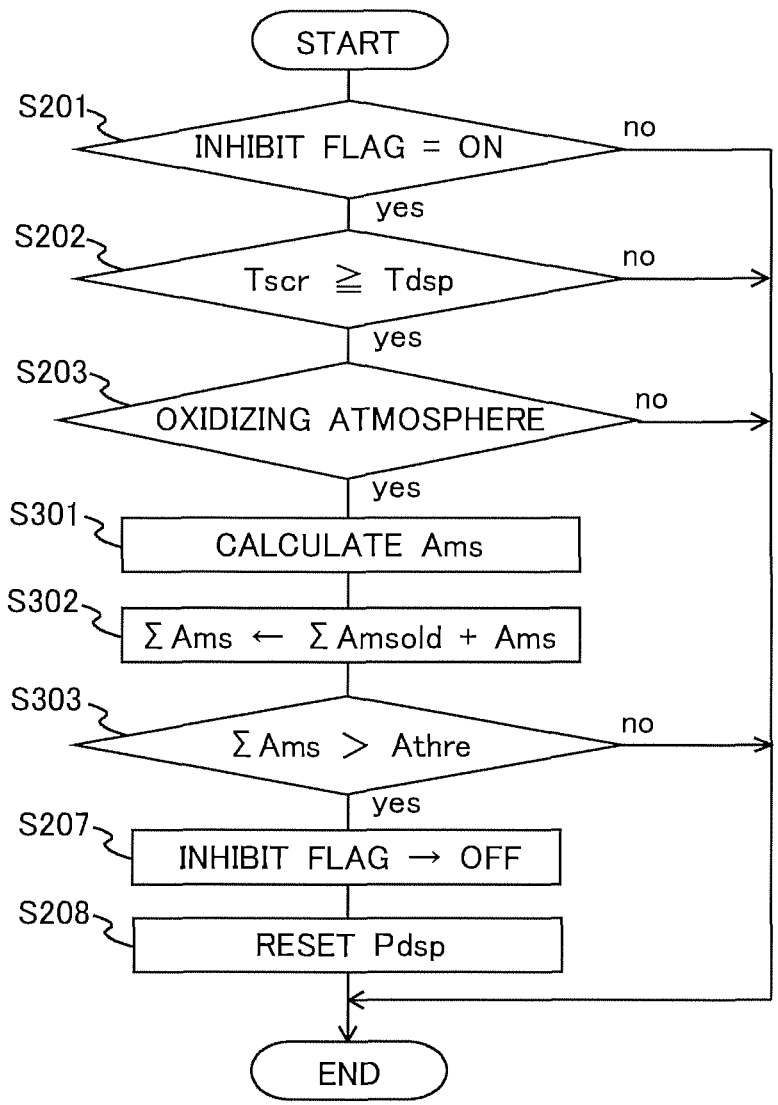

[Fig. 9]
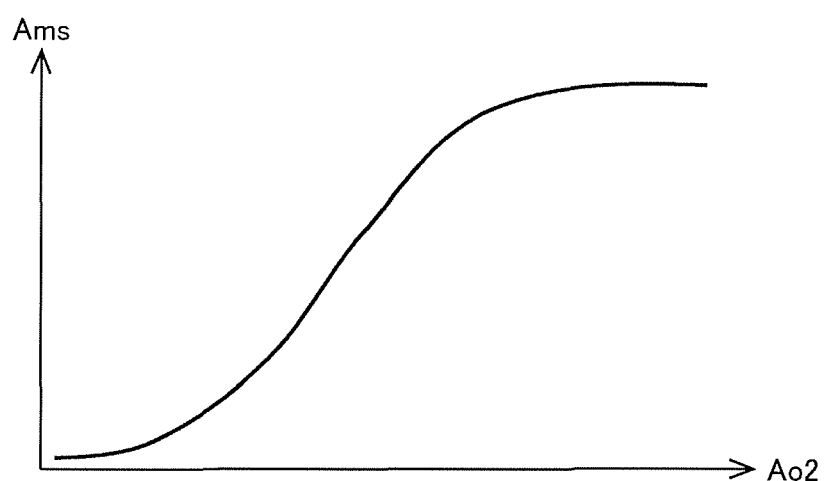

DETERIORATION DIAGNOSIS APPARATUS FOR SELECTIVE CATALYTIC REDUCTION CATALYST

BACKGROUND

Technical Field

The present disclosure relates to a technology for diagnosing the deterioration of a selective catalytic reduction (SCR) catalyst arranged in an exhaust passage of an internal combustion engine.

Description of Background Art

In a first patent literature, there is disclosed a technology in which provision is made for an exhaust gas purification catalyst arranged in an exhaust passage of an internal combustion engine, an air fuel ratio sensor arranged in the exhaust passage at a location upstream of the exhaust gas purification catalyst, and an air fuel ratio sensor arranged in the exhaust passage at a location downstream of the exhaust gas purification catalyst, wherein when the exhaust gas purification catalyst is in a low temperature state in which it begins to be activated, the deterioration of the exhaust gas purification catalyst is diagnosed based on a difference in the outputs of two air fuel ratio sensors (hereinafter referred to as a "sensor output difference"). In addition, in the first patent literature, it is suggested that a diagnosis according to the method described above can be applied, in cases where an SCR catalyst is used as the exhaust gas purification catalyst, too.

PATENT LITERATURE

Patent Literature 1: Japanese patent laid-open publication No. 2004-285840

SUMMARY

However, according to the above-mentioned conventional technologies, there is a possibility that a difference between a sensor output difference in the case where the SCR catalyst has not deteriorated and a sensor output difference in the case where the SCR catalyst has deteriorated may become small. As a result, it may be possible that the deterioration of the SCR catalyst can not be detected in an accurate manner, in cases where the degree of deterioration of the SCR catalyst is small, etc. On the other hand, there can be considered a method in which a pre-stage catalyst is arranged in the exhaust passage at a location upstream of the SCR catalyst, and a water gas shift reaction is made to be induced in the pre-stage catalyst, at the time of measuring the sensor output difference. A difference resulting from the hydrogen consumption capacity of the SCR catalyst is added to the sensor output difference measured by this method, and hence, it is possible to make larger the difference between the sensor output difference in the case where the SCR catalyst has not deteriorated and the sensor output difference in the case where the SCR catalyst has deteriorated. Thus, at the time of executing the deterioration diagnosis of the SCR catalyst, it is effective to make use of the hydrogen consumption capacity of the SCR catalyst.

However, when S purge processing for eliminating sulfur poisoning of the pre-stage catalyst is executed, the SCR catalyst may be subjected to sulfur poisoning due to sulfur, components which desorb from the pre-stage catalyst. In the case where the SCR catalyst is subjected to sulfur poisoning, the hydrogen consumption capacity of the SCR catalyst becomes lower, in comparison with the case where the SCR catalyst is not subjected to sulfur poisoning. Accordingly, when the deterioration diagnosis of the SCR catalyst according to a method using the hydrogen consumption capacity of the SCR catalyst is executed in the state where the SCR catalyst is subjected to sulfur poisoning, there is a possibility that a deterioration accompanied by an irreversible degradation of NOx reduction performance may not be detected with sufficient accuracy, as in the case of thermal deterioration or aged deterioration of the SCR catalyst.

Embodiment of the present disclosure has been made in view of the actual circumstances as referred to above, and the object of the present disclosure is to provide a technology which can suppress a decrease in diagnostic accuracy, in a deterioration diagnosis apparatus for a selective catalytic reduction catalyst in which deterioration of an SCR catalyst is diagnosed based on a sensor output difference which is a difference between an output of a first air fuel ratio sensor that measures a physical quantity correlated with an air fuel ratio of exhaust gas flowing into the SCR catalyst, and an output of a second air fuel ratio sensor that measures a physical quantity correlated with an air fuel ratio of exhaust gas flowing out from the SCR catalyst.

In order to solve the above-mentioned problems, the present disclosure resides in a deterioration diagnosis apparatus for a selective catalytic reduction catalyst in which when an air fuel ratio of a mixture to be combusted in an internal combustion engine is a lean air fuel ratio, inducement processing is executed which is to induce a water gas shift reaction in a pre-stage catalyst arranged at the upstream side of the SCR catalyst, by changing the air fuel ratio of the mixture from the lean air fuel ratio to a predetermined rich air fuel ratio, and diagnosis processing is executed which is to diagnose deterioration of the SCR catalyst based on an output difference between two air fuel ratio sensors at the time of the execution of the inducement processing, wherein when the SCR catalyst is in a state of being subjected to sulfur poisoning resulting from the execution of the S purge processing of the pre-stage catalyst, diagnosis processing is not executed.

Specifically, the present disclosure resides in a deterioration diagnosis apparatus for a selective catalytic reduction catalyst, which is applied to an exhaust gas purification system including: a pre-stage catalyst that is arranged in an exhaust passage of an internal combustion engine which is able to be operated in a lean burn state, and that is configured to generate a water gas shift reaction by making use of a reducing agent produced at the time of a mixture being combusted, when an air fuel ratio of the mixture is a predetermined rich air fuel ratio which is lower than a stoichiometric air fuel ratio; an SCR catalyst that is arranged in the exhaust passage at a location downstream of the pre-stage catalyst, and that is configured to have a function to store oxygen in exhaust gas when an air fuel ratio of the exhaust gas is a lean air fuel ratio higher than the stoichiometric air fuel ratio, but to desorb the oxygen thus stored when the air fuel ratio of the exhaust gas is equal to or lower than the stoichiometric air fuel ratio; a first air fuel ratio sensor that is arranged in the exhaust passage at a location between the pre-stage catalyst and the SCR catalyst, and that is configured to measure a physical quantity correlated with an air fuel ratio of exhaust gas flowing into the SCR catalyst; and a second air fuel ratio sensor that is arranged in the exhaust passage at a location downstream of the SCR catalyst, and that is configured to measure a physical quantity correlated with an air fuel ratio of exhaust gas flowing out from the SCR catalyst. And, the deterioration diagnosis apparatus comprises a controller that is configured to execute an inducement processing, which is to induce a water gas shift reaction in the pre-stage catalyst, by controlling an operating state of the internal combustion engine so that the air fuel ratio of the mixture is changed to the predetermined rich air fuel ratio, when the air fuel ratio of the mixture is the lean air fuel ratio, and to execute a diagnosis processing, which is to diagnose deterioration of the SCR catalyst based on a total sensor output difference which is an integrated value of a difference between a measured value of the first air fuel ratio sensor and a measured value of the second air fuel ratio sensor in a period of time in which the water gas shift reaction occurs in the pre-stage catalyst by the execution of the inducement processing. In addition, the controller inhibits the execution of the diagnosis processing in a period of time from when the S purge processing, which is to eliminate the sulfur poisoning of the pre-stage catalyst, is terminated, until a desorption period of time, which is a period of time in which oxygen is estimated to be supplied to the SCR catalyst in a state where the temperature of the SCR catalyst becomes equal to or higher than a desorption temperature which is a temperature at which sulfur components desorb from the SCR catalyst, exceeds a predetermined period of time.

Here, note that the "deterioration of the SCR catalyst" referred to herein means not a reversible degradation of NOx reduction performance such as in cases where the SCR catalyst has been subjected to sulfur poisoning, but an irreversible degradation of NOx reduction performance such as in cases where the SCR catalyst has been subjected to thermal deterioration or aged deterioration. In addition, the meaning of "it is estimated that oxygen is supplied to the SCR catalyst" is a state in which the exhaust gas containing oxygen contributing to the desorption of the sulfur components adsorbed to the SCR catalyst is estimated to flow into the SCR catalyst, e.g., a state in which the air fuel ratio of the exhaust gas flowing into the SCR catalyst is estimated to be a lean air fuel ratio higher than the stoichiometric air fuel ratio. The "desorption period of time" is not limited to a continuous period of time, but may be an intermittent period of time. Moreover, the meaning of "said controller inhibits the execution of the diagnosis processing" includes a mode in which even in cases where an execution condition for diagnosis processing (hereinafter, referred to as a "diagnosis condition") is satisfied, the execution of diagnosis processing is inhibited, or a mode in which a condition that the SCR catalyst is not subjected to sulfur poisoning is included as one of the diagnosis condition. The "predetermined period of time" is a period of time which is considered to be required to eliminate the sulfur poisoning of the SCR catalyst resulting from the S purge processing of the pre-stage catalyst under the condition that oxygen is supplied to the SCR catalyst in a state where the temperature of the SCR catalyst becomes equal to or higher than the desorption temperature.

When the air fuel ratio of the exhaust gas flowing into the SCR catalyst becomes a lean air fuel ratio by controlling the air fuel ratio of the mixture to be combusted in the internal combustion engine to a lean air fuel ratio, the oxygen contained in the exhaust gas is occluded or stored in the SCR catalyst. When the inducement processing is executed in such a state, the air fuel ratio of the mixture is changed from the lean air fuel ratio to the predetermined rich air fuel ratio, in accordance with which the air fuel ratio of the exhaust gas flowing into the pre-stage catalyst changes from a lean air fuel ratio to a rich air fuel ratio, and at the same time, the air fuel ratio of the exhaust gas flowing into the SCR catalyst also changes from a lean air fuel ratio to a rich air fuel ratio. As a result, the oxygen stored in the SCR catalyst desorbs from the SCR catalyst.

The oxygen desorbed from the SCR catalyst flows out from the SCR catalyst together with the exhaust gas. For that reason, the air fuel ratio of the exhaust gas flowing out from the SCR catalyst becomes higher than the air fuel ratio of the exhaust gas flowing into the SCR catalyst. As a result, there occurs a difference between the measured value of the first air fuel ratio sensor and the measured value of the second air fuel ratio sensor, resulting from the amount of the oxygen desorbed from the SCR catalyst.

In addition, when the air fuel ratio of the mixture has been made to be the predetermined rich air fuel ratio by the execution of the inducement processing, hydrogen is produced in the pre-stage catalyst due to the occurrence of the water gas shift reaction. The hydrogen thus produced in the pre-stage catalyst arrives at the first air fuel ratio sensor, together with the exhaust gas. At that time, because the diffusion rate of the hydrogen is faster than that of any of the other exhaust gas components, the hydrogen precedently arrives at a sensor element of the first air fuel ratio sensor, thus putting the surrounding atmosphere of the sensor element into a rich atmosphere. As a result, the measured value of the first air fuel ratio sensor becomes lower than an actual air fuel ratio (rich shift). On the other hand, when the hydrogen produced in the pre-stage catalyst flows into the SCR catalyst, it is consumed by being converted into water by means of the SCR catalyst. As a result, the rich shift of the second air fuel ratio sensor becomes smaller than the rich shift of the first air fuel ratio sensor. Accordingly, there also occurs a difference between the measured value of the first air fuel ratio sensor and the measured value of the second air fuel ratio sensor, resulting from the amount of the hydrogen consumed by the SCR catalyst.

Accordingly, a difference resulting from the amount of the hydrogen consumed by the SCR catalyst in addition to the difference resulting from the amount of the oxygen desorbed from the SCR catalyst is included in the difference between the measured value of the first air fuel ratio sensor and the measured value of the second air fuel ratio sensor in the period of time in which the water gas shift reaction occurs in the pre-stage catalyst by the execution of the inducement processing (hereinafter, referred to as a reaction occurrence period).

Here, as the SCR catalyst deteriorates, the oxygen storage capacity and the hydrogen consumption capacity of the SCR catalyst deteriorate, in addition to the NOx reduction performance of the SCR catalyst. For that reason, in the case where the SCR catalyst has deteriorated, the amount of oxygen desorbing from the SCR catalyst during the reaction occurrence period becomes smaller, and at the same time, the amount of hydrogen consumed in the SCR catalyst becomes smaller, in comparison with the case where the SCR catalyst has not deteriorated. As a result, the measured value of the second air fuel ratio sensor becomes closer to the measured value of the first air fuel ratio sensor.

As described above, in the case where the SCR catalyst has not deteriorated, the sensor output difference in the reaction period of time becomes large due to the synergetic effect of the oxygen storage capacity and the hydrogen consumption capacity of the SCR catalyst, but in contrast to this, in the case where the SCR catalyst has deteriorated, the sensor output difference becomes small due to the synergetic effect of a deterioration in the oxygen storage capacity and a deterioration in the hydrogen consumption capacity of the SCR catalyst. For that reason, the total sensor output difference in the reaction period of time differs to a large extent between the case where the SCR catalyst has not deteriorated and the case where the SCR catalyst has deteriorated.

When a remarkable difference occurs in the total sensor output difference between the case where the SCR catalyst has not deteriorated and the case where the SCR catalyst has deteriorated, even in cases where an error resulting from a variation (individual difference) of the first air fuel sensor and/or the second air fuel sensor is included in the measured values of these sensors, the influence of the error becomes relatively small. Accordingly, it becomes possible to execute deterioration diagnosis of the SCR catalyst with sufficient accuracy.

However, in the case where the SCR catalyst is subjected to sulfur poisoning, the amount of hydrogen consumed in the SCR catalyst during the reaction occurrence period becomes smaller, in comparison with the case where it is not subjected to sulfur poisoning. For that reason, when inducement processing is executed in the state where the SCR catalyst is subjected to sulfur poisoning, the total sensor output difference in the reaction occurrence period becomes small. Accordingly, when diagnosis processing is executed based on the total sensor output difference at the time of the inducement processing being executed in the state where the SCR catalyst 50 is subjected to sulfur poisoning, a deterioration accompanied by an irreversible degradation of the NOx reduction performance may not be detected with sufficient accuracy.

Here, the sulfur poisoning of the SCR catalyst is easy to occur when the S purge processing of the pre-stage catalyst is executed. In other words, when the S purge processing of the pre-stage catalyst is executed, the sulfur components desorbing from the pre-stage catalyst are adsorbed to the SCR catalyst which is arranged at the downstream side of the pre-stage catalyst. As a result, the sulfur poisoning of the SCR catalyst occurs. On the other hand, the sulfur components adsorbed to the SCR catalyst desorb from the SCR catalyst when oxygen is supplied to the SCR catalyst in the state where the temperature of the SCR catalyst becomes equal to or higher than the desorption temperature.

Accordingly, the deterioration diagnosis apparatus for a selective catalytic reduction catalyst of the present disclosure inhibits the execution of the diagnosis processing in a period of time from when the S purge processing of the pre-stage catalyst is terminated until the desorption period of time, which is the period of time in which oxygen is estimated to be supplied to the SCR catalyst in the state where the temperature of the SCR catalyst becomes equal to or higher than the desorption temperature, exceeds the predetermined period of time. The "predetermined period of time" referred to herein is a period of time which is considered to be required to eliminate the sulfur poisoning of the SCR catalyst resulting from the S purge processing of the pre-stage catalyst under the condition that oxygen is supplied to the SCR catalyst in the state where the temperature of the SCR catalyst becomes equal to or higher than the desorption temperature, as mentioned above. For that reason, it can be assumed that the SCR catalyst is in a state of being subjected to sulfur poisoning after the S purge processing of the pre-stage catalyst is terminated until the desorption period of time exceeds the predetermined period of time. Accordingly, when the execution of the diagnosis processing is inhibited in the period of time after the S purge processing of the pre-stage catalyst is terminated until the desorption period of time exceeds the predetermined period of time, the diagnosis processing is suppressed from being executed based on the total sensor output difference at the time of the inducement processing being executed in the state where the SCR catalyst is subjected to sulfur poisoning. As a result, it is possible to suppress the reduction in accuracy of the diagnosis resulting from the sulfur poisoning of the SCR catalyst.

Here, the controller may calculate an integrated time calculation value correlated with an integrated value of a period of time in which a condition is satisfied under which after the S purge processing of the pre-stage catalyst is terminated, oxygen is estimated to be supplied to the selective catalytic reduction catalyst in the state where the temperature of the selective catalytic reduction catalyst becomes equal to or higher than the desorption temperature which is the temperature at which sulfur components desorb from the selective catalytic reduction catalyst, and the controller may make a determination that the desorption period of time has exceeded the predetermined period of time, when the integrated time calculation value thus obtained has exceeded a predetermined required desorption period of time. The "required desorption period of time" referred to herein is a period of time which is considered to be required to eliminate the sulfur poisoning of the SCR catalyst resulting from the S purge processing of the pre-stage catalyst under the condition that oxygen is supplied to the SCR catalyst in the state where the temperature of the SCR catalyst becomes equal to or higher than the desorption temperature. According to such a configuration, the execution of the diagnosis processing is inhibited after the S purge processing of the pre-stage catalyst is terminated until the integrated time calculation value exceeds the required desorption period of time. As a result, the diagnosis processing is suppressed from being executed based on the total sensor output difference at the time of the inducement processing being executed in the state where the SCR catalyst is subjected to sulfur poisoning.

Here, note that according to the knowledge of the present inventors, a first temperature range, a second temperature range higher than the first temperature range, and a third temperature range higher than the second temperature range are included in a temperature region which is equal to or higher than the desorption temperature, and it becomes easier for the sulfur components to desorb from the SCR catalyst, when the temperature of the SCR catalyst falls within the first temperature range or the third temperature range, in comparison with the time when the temperature of the SCR catalyst falls within the second temperature range. Accordingly, in the desorption period of time, when the temperature of the selective catalytic reduction catalyst falls within the first temperature range or the third temperature range, the controller may make larger an amount of update per time of the integrated time calculation value in comparison with the time when the temperature of the selective catalytic reduction catalyst falls within the second temperature range. According to such a configuration, when the temperature of the SCR catalyst falls within a temperature range in which the sulfur components are easy to desorb from the SCR catalyst, among the above-mentioned three temperature ranges, the amount of update per time of the integrated time calculation value becomes large. As a result, it becomes possible to more accurately determine the time when the sulfur poisoning of the SCR catalyst resulting from the S purge processing is eliminated, after the end of the S purge processing of the pre-stage catalyst. Accordingly, after the end of the S purge processing of the pre-stage catalyst, it is possible to suppress the diagnosis processing from being executed before the sulfur poisoning of the SCR catalyst resulting from the S purge processing is eliminated, or even after the sulfur poisoning of the SCR catalyst resulting from the S purge processing has been eliminated, it is possible to suppress the execution of the diagnosis processing from being inhibited in a more reliable manner.

In addition, the inventors of the present application has obtained the knowledge that in the case where the temperature of the SCR catalyst at the time of the execution of the S purge processing of the pre-stage catalyst is low, it becomes easier for the sulfur components to desorb from the SCR catalyst in the desorption period of time after the end of the S purge processing, in comparison with the case where the temperature of the SCR catalyst is high. According to such knowledge, it can be the that in the case where the temperature of the SCR catalyst at the time of the execution of the S purge processing of the pre-stage catalyst is low, the sulfur poisoning of the SCR catalyst resulting from the S purge processing of the pre-stage catalyst is eliminated earlier or more quickly, in comparison with the case where the temperature of the SCR catalyst is high. Accordingly, the controller may make larger the amount of update per time of the integrated time calculation value in the case where the temperature of the SCR catalyst at the time of the execution of the S purge processing of the pre-stage catalyst is low, in comparison with the case where it is high. According to such a configuration, in the case where the temperature of the SCR catalyst at the time of the execution of the S purge processing of the pre-stage catalyst is low, the period of time required for the integrated time calculation value to exceed the required desorption period of time becomes shorter, in comparison with the case where the temperature of the SCR catalyst is high. As a result, it becomes possible to more accurately determine the time when the sulfur poisoning of the SCR catalyst resulting from the S purge processing is eliminated, after the end of the S purge processing of the pre-stage catalyst. Accordingly, after the end of the S purge processing of the pre-stage catalyst, it is possible to suppress the diagnosis processing from being executed before the sulfur poisoning of the SCR catalyst resulting from the S purge processing is eliminated, or even after the sulfur poisoning of the SCR catalyst resulting from the S purge processing has been eliminated, it is possible to suppress the execution of the diagnosis processing from being inhibited, in a more reliable manner.

Then, the controller may calculate an instantaneous desorption amount correlation value which is a physical quantity correlated with an amount of sulfur components desorbing per unit time from the SCR catalyst, by using, as a parameter, an amount of oxygen supplied to the SCR catalyst in the desorption period of time, and the controller may make a determination that the desorption period of time has exceeded the predetermined period of time, when an integrated value of the instantaneous desorption amount correlation value thus obtained has exceeded a predetermined amount of desorption. That is, the controller may determine whether the desorption period of time has exceeded the predetermined period of time, by comparing the integrated value of the instantaneous desorption amount correlation value with the predetermined amount of desorption. The "predetermined amount of desorption" referred to herein is an amount of sulfur components estimated to be adsorbed to the SCR catalyst at the time of the S purge processing of the pre-stage catalyst being executed. The amount of sulfur components to be adsorbed to the SCR catalyst at the time of the S purge processing of the pre-stage catalyst being executed is correlated with an amount of sulfur components desorbing from the pre-stage catalyst at the time of the S purge processing of the pre-stage catalyst being executed, i.e., an amount of sulfur components having been adsorbed to the pre-stage catalyst at the time of the S purge processing of the pre-stage catalyst being started. Accordingly, the predetermined amount of desorption may be set to the amount of sulfur components having been adsorbed to the pre-stage catalyst at the time of the S purge processing of the pre-stage catalyst being started. According to such a configuration, it becomes possible to more accurately determine the time when the sulfur poisoning of the SCR catalyst resulting from the S purge processing is eliminated, after the end of the S purge processing of the pre-stage catalyst. As a result, the diagnosis processing is more reliably suppressed from being executed based on the total sensor output difference at the time of the inducement processing being executed in the state where the SCR catalyst is subjected to sulfur poisoning.

Here, note that in the desorption period of time, an amount of sulfur components desorbing per unit time from the SCR catalyst becomes larger when an amount of oxygen supplied per unit time to the SCR catalyst is large, in comparison with the time when it is small. Accordingly, as the instantaneous desorption amount correlation value, there may be used the amount of oxygen supplied per unit time to the SCR catalyst in the desorption period of time, or there may also be used the amount of sulfur components desorbing per unit time from the SCR catalyst, which is calculated based on the amount of oxygen supplied per unit time to the SCR catalyst, in the desorption period of time.

As described above, in the configuration in which the determination as to whether the desorption period of time has exceeded the predetermined period of time is made by comparing the integrated value of the instantaneous desorption amount correlation value with the predetermined amount of desorption, the instantaneous desorption amount correlation value may be made larger when the temperature of the SCR catalyst in the desorption period of time falls within the first temperature range or the third temperature range, in comparison with the time when the temperature of the SCR catalyst falls within the second temperature range. According to such a configuration, it becomes possible to more accurately determine the time when the sulfur poisoning of the SCR catalyst resulting from the S purge processing is eliminated, after the end of the S purge processing of the pre-stage catalyst.

Moreover, in the configuration in which the determination as to whether the desorption period of time has exceeded the predetermined period of time is made by comparing the integrated value of the instantaneous desorption amount correlation value with the predetermined amount of desorption, the instantaneous desorption amount correlation value may also be made to a larger value when the temperature of the SCR catalyst at the time of the execution of the S purge processing of the pre-stage catalyst is low, in comparison with the time when it is high. According to such a configuration, it becomes possible to more accurately determine the time when the sulfur poisoning of the SCR catalyst resulting from the S purge processing is eliminated, after the end of the S purge processing of the pre-stage catalyst.

According to the present disclosure, a decrease in diagnostic accuracy can be suppressed, in a deterioration diagnosis apparatus for a selective catalytic reduction catalyst in which deterioration of an SCR catalyst is diagnosed based on a sensor output difference which is a difference between an output of a first air fuel ratio sensor that measures a physical quantity correlated with an air fuel ratio of exhaust gas flowing into the SCR catalyst, and an output of a second air fuel ratio sensor that measures a physical quantity correlated with an air fuel ratio of exhaust gas flowing out from the SCR catalyst.

Further features of the present disclosure will become apparent from the following description of exemplary embodiments with reference to the attached drawings.

BRIEF DESCRIPTION OF THE DRAWINGS

FIG. 1 is a view showing the schematic construction of an exhaust system of an internal combustion engine to which the present disclosure is applied, in a first embodiment of the present disclosure.

FIG. 2 is a timing chart showing the changes over time of an air fuel ratio (A/F) of a mixture, a measured value Raf1 of a first air fuel ratio sensor and a measured value Raf2 of a second air fuel ratio sensor, in the case where inducement processing is executed.

FIG. 3 is a flow chart showing a processing routine executed by an ECU, at the time of executing deterioration diagnosis of an SCR catalyst, in the first embodiment of the present disclosure.

FIG. 4 is a flow chart showing a processing routine executed by the ECU, at the time of determining whether sulfur poisoning of the SCR catalyst resulting from S purge processing of an NSR catalyst has been eliminated, in the first embodiment of the present disclosure.

FIG. 5 is a view showing a correlation between a temperature Tscr of the SCR catalyst and an S concentration of exhaust gas flowing out from the SCR catalyst, in the case where the temperature of the SCR catalyst is equal to or higher than a desorption temperature.

FIG. 6 is a flow chart showing a processing routine executed by the ECU, at the time of determining whether sulfur poisoning of the SCR catalyst resulting from the S purge processing of the NSR catalyst has been eliminated, in a first modification of the first embodiment of the present disclosure.

FIG. 7 is a view showing a correlation among the temperature Tscr of the SCR catalyst, a temperature Tscrp of the SCR catalyst at the time of the execution of the purge processing of the NSR catalyst, and the S concentration of exhaust gas flowing out from the SCR catalyst, in the case where the temperature of the SCR catalyst is equal to or higher than the desorption temperature.

FIG. 8 is a flow chart showing a processing routine executed by an ECU, at the time of determining whether sulfur poisoning of an SCR catalyst resulting from S purge processing of an NSR catalyst has been eliminated, in a second embodiment of the present disclosure.

FIG. 9 is a view showing a correlation between an instantaneous amount of supply Ao2 and an instantaneous amount of desorption Ams in the case where the temperature of the SCR catalyst is equal to or higher than the desorption temperature.

DETAILED DESCRIPTION

Hereinafter, specific embodiments of the present disclosure will be described based on the attached drawings. However, the dimensions, materials, shapes, relative arrangements and so on of component parts described in the embodiments are not intended to limit the technical scope of the present disclosure to these alone in particular as long as there are no specific statements.

Embodiment 1

First, reference will be made to a first embodiment of the present disclosure based on FIGS. 1 through 4. FIG. 1 is a view showing the schematic construction of an exhaust system of an internal combustion engine, to which the present disclosure is applied. The internal combustion engine 1 shown in FIG. 1 is a spark ignition type internal combustion engine (gasoline engine) which is able to be operated (in lean burn operation) by combusting a mixture having a lean air fuel ratio higher than a stoichiometric air fuel ratio.

The internal combustion engine 1 is provided with fuel injection valves 2 for supplying fuel to individual cylinders, respectively. Each of the fuel injection valves 2 may be a valve mechanism which serves to inject fuel into an intake port of each corresponding cylinder, or may be a valve mechanism which serves to inject fuel into each corresponding cylinder.

An exhaust pipe 3, through which gas (exhaust gas) having been combusted or burned in the cylinders passes, is connected to the internal combustion engine 1. A first catalyst casing 4 is arranged in the middle of the exhaust pipe 3. The first catalyst casing 4 receives an NOx storage reduction catalyst (hereinafter, referred to as an "NSR catalyst") 40 as a "pre-stage catalyst" according to the present disclosure. Specifically, the first catalyst casing 4 receives a honeycomb structured body covered with a coat layer such as alumina, a precious metal (platinum (Pt), palladium (Pd), etc.) supported by the coat layer, a promoter or co-catalyst such as ceria ($CeO_2$) supported by the coat layer, and an NOx occlusion or storage material (alkalines, alkaline earths, etc.) supported by the coat layer.

A second catalyst casing 5 is arranged in the exhaust pipe 3 at the downstream side of the first catalyst casing 4. The second catalyst casing 5 receives an SCR catalyst 50. Specifically, the second catalyst casing 5 receives a honeycomb structured body made of cordierite or Fe—Cr—Al based heat resisting steel, a zeolite based coat layer covering the honeycomb structured body, and a transition metal (copper (Cu), iron (Fe), etc.) supported by the coat layer.

In the internal combustion engine 1 constructed in this manner, there is arranged in combination therewith an ECU (Electronic Control Unit) 6 as a "controller" according to the present disclosure. The ECU 6 is an electronic control unit which is composed of a CPU, a ROM, a RAM, a backup RAM, and so on. The ECU 6 is electrically connected to a variety of kinds of sensors such as a first air fuel ratio sensor 7, a second air fuel ratio sensor 8, an exhaust gas temperature sensor 9, an accelerator position sensor 10, a crank position sensor 11, an air flow meter 12, and so on.

The first air fuel ratio sensor 7 is mounted on the exhaust pipe 3 at a location between the first catalyst casing 4 and the second catalyst casing 5, and outputs an electric signal correlated with an air fuel ratio of exhaust gas which flows into the SCR catalyst 50 of the second catalyst casing 5. Here, note that the air fuel ratio of the exhaust gas flowing into the SCR catalyst 50 may be calculated from a measured value of an oxygen concentration sensor that is mounted on the exhaust pipe 3, instead of the first air fuel ratio sensor 7.

The second air fuel ratio sensor 8 is mounted on the exhaust pipe 3 at a location downstream of the second catalyst casing 5, and outputs an electric signal correlated with an air fuel ratio of exhaust gas which flows out from the SCR catalyst 50 of the second catalyst casing 5. Here, note that the air fuel ratio of the exhaust gas flowing out from the SCR catalyst 50 may be calculated from a measured value of an oxygen concentration sensor that is mounted on the exhaust pipe 3, instead of the second air fuel ratio sensor 8.

The exhaust gas temperature sensor 9 is mounted on the exhaust pipe 3 at a location downstream of the second catalyst casing 5, and outputs an electric signal correlated with the temperature of the exhaust gas flowing out from the SCR catalyst 50 of the second catalyst casing 5. The accelerator position sensor 10 is mounted on an unillustrated accelerator pedal, and outputs an electric signal correlated with an amount of operation of the accelerator pedal (i.e., a degree of accelerator opening). The crank position sensor 11 is mounted on the internal combustion engine 1, and outputs an electric signal correlated with a rotational position of an engine output shaft (crankshaft). The air flow meter 12 is mounted on an intake pipe (not shown) of the internal combustion engine 1, and outputs an electrical signal correlated with an amount (mass) of fresh air (i.e., air) flowing in the intake pipe.

The ECU 6 controls the operating state of the internal combustion engine 1 based on the output signals of the above-mentioned variety of kinds of sensors. For example, the ECU 6 calculates a target air fuel ratio of the mixture based on an engine load calculated from the output signal of the accelerator position sensor 10 (the accelerator opening degree) and an engine rotational speed calculated from the output signal of the crank position sensor 11. The ECU 6 calculates a target amount of fuel injection (a fuel injection period) based on the target air fuel ratio and the output signal of the air flow meter 12 (the amount of intake air), and operates the fuel injection valves 2 according to the target amount of fuel injection thus calculated. At that time, the ECU 6 sets the target air fuel ratio to a lean air fuel ratio which is higher than the stoichiometric air fuel ratio, in cases where the operating state of the internal combustion engine 1 is in a low rotation and low load region or in a middle rotation and middle load region. In addition, the ECU 6 sets the target air fuel ratio to the stoichiometric air fuel ratio or a rich air fuel ratio which is lower than the stoichiometric air fuel ratio, in cases where the operating state of the internal combustion engine 1 is in a high load region or a high rotation region. Thus, when the operating state of the internal combustion engine 1 belongs to the low rotation and low load region or the middle rotation and middle load region (hereinafter, these operating regions being referred to as a "lean operating region"), the target air fuel ratio is set to a lean air fuel ratio, so that the internal combustion engine 1 is operated in a lean burn state, thereby making it possible to suppress the amount of fuel consumption to a low level.

In addition, the ECU 6 executes a rich spike processing in an appropriate manner, when the operating state of the internal combustion engine 1 is in the above-mentioned lean operating region. The rich spike processing is to adjust the amount of fuel injection and the amount of intake air in such a manner that the concentration of oxygen in the exhaust gas becomes low and the concentration of hydrocarbon or carbon monoxide therein becomes high. The NSR catalyst 40 in the first catalyst casing 4 stores or adsorbs NOx in the exhaust gas, when the oxygen concentration of the exhaust gas flowing into the NSR catalyst 40 is high (i.e., when the air fuel ratio of the exhaust gas is a lean air fuel ratio), and releases the NOx stored in the NSR catalyst 40 so as to reduce the NOx thus released to nitrogen (N2) or ammonia (NH3), when the oxygen concentration of the exhaust gas flowing into the NSR catalyst 40 is low, and when reducing components such as hydrocarbon, carbon monoxide, etc., are contained in the exhaust gas (i.e., when the air fuel ratio of the exhaust gas is a rich air fuel ratio). As a result, when rich spike processing is executed, the NOx storage capacity of the NSR catalyst 40 will be regenerated. Accordingly, the ECU 6 suppresses the NOx storage capacity of the NSR catalyst 40 from being saturated, by executing the rich spike processing, when an amount of NOx (an NOx storage amount) stored in the NSR catalyst 40 of the first catalyst casing 4 becomes equal to or larger than a fixed amount, or when the operation time of the internal combustion engine 1 from the end time of the last rich spike processing (preferably, the operation time in a state where the target air fuel ratio has been set to the lean air fuel ratio) becomes equal to or more than a fixed period of time, or when the travel distance of a vehicle, on which the internal combustion engine 1 is mounted, from the end time of the last rich spike processing (preferably, the travel distance in the state where the target air fuel ratio has been set to the lean air fuel ratio) becomes equal to or more than a fixed distance.

Here, note that as a specific method of executing the rich spike processing, there can be used a method of decreasing the air fuel ratio of a mixture to be supplied for combustion in the internal combustion engine 1, by executing at least one of processing to increase the target amount of fuel injection for the fuel injection valves 2, and processing to decrease the opening degree of an intake air throttle valve (throttle valve). In addition, in a construction in which each of the fuel injection valves 2 injects fuel directly into a corresponding cylinder, the rich spike processing may be executed by a method of injecting fuel from each of the fuel injection valves 2 in the exhaust stroke of the corresponding cylinder.

Moreover, the SCR catalyst 50 of the second catalyst casing 5 serves to adsorb ammonia contained in the exhaust gas, and to reduce NOx contained in the exhaust gas by means of the ammonia thus adsorbed. The ammonia to be supplied to the SCR catalyst 50 of the second catalyst casing 5 is produced in the NSR catalyst 40 of the first catalyst casing 4. For example, in cases where the rich spike processing is executed, a part of the NOx desorbed from the NSR catalyst 40 in the first catalyst casing 4 reacts with hydrocarbon or hydrogen in the exhaust gas so as to be reduced to ammonia. At that time, the amount of ammonia produced in the NSR catalyst 40 changes according to the interval in which the rich spike processing is executed, the air fuel ratio of the exhaust gas at the time when the rich spike processing is executed, or the like. Accordingly, when it is necessary to supply ammonia to the SCR catalyst 50, the ECU 6 may set the interval of execution of the rich spike processing to an interval suitable for production of ammonia, or may set the air fuel ratio of the exhaust gas at the time of the execution of the rich spike processing to an air fuel ratio (e.g., 14.1 or therearound) suitable for production of ammonia.

When the rich spike processing is executed according to a variety of purposes as referred to above, it is possible to remove or reduce the NOx contained in the exhaust gas at the time when the internal combustion engine 1 is operated in a lean burn state. However, when the SCR catalyst 50 received in the second catalyst casing 5 deteriorates, the NOx having not been fully reduced by the NSR catalyst 40 in the first catalyst casing 4 at the time of the lean burn operation of the internal combustion engine 1 may be discharged into the atmosphere, without being reduced in the second catalyst casing 5, too. For that reason, in cases where the SCR catalyst 50 of the second catalyst casing 5 has deteriorated, it is necessary to detect the deterioration of the SCR catalyst 50 in a quick manner, so that the driver of a vehicle with the internal combustion engine 1 mounted thereon can be prompted to repair the SCR catalyst 50, or the lean burn operation of the internal combustion engine 1 can be inhibited. Hereinafter, reference will be made to a method of diagnosing deterioration of the SCR catalyst 50 received in the second catalyst casing 5. Here, note that the "deterioration of the SCR catalyst 50" referred to herein means not a reversible degradation of NOx reduction performance such as sulfur poisoning to be described later, but an irreversible degradation of NOx reduction performance.

The SCR catalyst 50 stores the oxygen in the exhaust gas under the action of the transition metal with which the SCR catalyst 50 is equipped, when the air fuel ratio of the exhaust gas is a lean air fuel ratio. Then, the oxygen stored in the SCR catalyst 50 desorbs from the SCR catalyst 50, when the air fuel ratio of the exhaust gas changes from the lean air fuel ratio to a rich air fuel ratio. Such an oxygen storage capacity of the SCR catalyst 50 is correlated with the NOx reduction performance of the SCR catalyst 50. For example, in the case where the degree of deterioration of the SCR catalyst 50 is large, the NOx reduction performance thereof becomes lower and the oxygen storage capacity thereof becomes smaller, in comparison with the case where the degree of deterioration of the SCR catalyst 50 is small. As a result, by obtaining the oxygen storage capacity of the SCR catalyst 50, it can be determined whether the NOx reduction performance of the SCR catalyst 50 has deteriorated.

The oxygen storage capacity of the SCR catalyst 50 is correlated with the amount of oxygen which desorbs from the SCR catalyst 50 in the case where the air fuel ratio of the exhaust gas has been changed from the lean air fuel ratio to the rich air fuel ratio. The amount of oxygen desorbing from the SCR catalyst 50 in the case where the air fuel ratio of the exhaust gas has been changed from the lean air fuel ratio to the rich air fuel ratio can be obtained based on a difference between the air fuel ratio (or oxygen concentration) of the exhaust gas flowing into the SCR catalyst 50 and the air fuel ratio (or oxygen concentration) of the exhaust gas flowing out from the SCR catalyst 50.

For example, in the case where the air fuel ratio of the exhaust gas has been changed from the lean air fuel ratio to the rich air fuel ratio, a difference (i.e., a sensor output difference) between the measured value of the first air fuel ratio sensor 7 and the measured value of the second air fuel ratio sensor 8 is obtained, and by substituting the difference thus obtained into the following expression (1), an amount of oxygen Aox desorbed from the SCR catalyst 50 can be obtained at each time point.

$$Aox = \Delta A/F * \alpha * Qinj \qquad (1)$$

In the above-mentioned expression (1), $\Delta A/F$ is a value which is obtained by subtracting the measured value of the first air fuel ratio sensor 7 from the measured value of the second air fuel ratio sensor 8; $\alpha$ is a mass ratio of the oxygen contained in the air; and Qinj is an amount of fuel injection.

Here, even if the air fuel ratio of the exhaust gas is changed from the lean air fuel ratio to the rich air fuel ratio, oxygen desorbs from the SCR catalyst 50, and hence, the measured value of the second air fuel ratio sensor 8 does not immediately become the rich air fuel ratio, but indicates the stoichiometric air fuel ratio. Thereafter, when all the oxygen stored in the SCR catalyst 50 has fully desorbed therefrom, the measured value of the second air fuel ratio sensor 8 will indicate a rich air fuel ratio. Accordingly, a total amount of the oxygen desorbing from the SCR catalyst 50 (oxygen storage capacity) can be obtained by executing the calculation processing using the above-mentioned expression (1) in a repeated manner and integrating the results of the calculations, in a period of time from the time point when the air fuel ratio of the exhaust gas has been changed from the lean air fuel ratio to the rich air fuel ratio, until the time point when the measured value of the second air fuel ratio sensor 8 indicates the rich air fuel ratio. When deterioration diagnosis of the SCR catalyst 50 is executed based on the oxygen storage capacity obtained in such a manner, it is possible to make the deterioration diagnosis of the SCR catalyst 50, without making use of an expensive sensor such as an NOx sensor, an NH3 sensor, etc.

However, the oxygen storage capacity of the SCR catalyst 50 at the time of the SCR catalyst 50 being in an undeteriorated or normal state is smaller, in comparison with that of a three-way catalyst, the NSR catalyst 40, or the like, which includes an oxygen occlusion or storage material such as ceria. For that reason, when errors resulting from variation in the first air fuel ratio sensor 7 or the second air fuel ratio sensor 8 are included in the measured values of those sensors, the oxygen storage capacity of the SCR catalyst 50 can not be obtained with sufficient accuracy, and the degree of deterioration of the SCR catalyst 50 may not be able to be diagnosed with sufficient accuracy.

Accordingly, in this embodiment, at the time of diagnosing the deterioration of the SCR catalyst 50, processing is executed in which a water gas shift reaction is induced in the NSR catalyst 40 of the first catalyst casing 4 (inducement processing). The "inducement processing" referred to herein is processing in which when the operating state of the internal combustion engine 1 is in the lean operating region, the air fuel ratio of the exhaust gas flowing into the NSR catalyst 40 of the first catalyst casing 4 is made to be a predetermined rich air fuel ratio suitable for the water gas shift reaction, and is processing in which the air fuel ratio of the mixture to be combusted in the internal combustion engine 1 and the air fuel ratio of the exhaust gas to be discharged from the internal combustion engine 1 are each made to be the predetermined rich air fuel ratio, by executing at least one of an increase in the amount of fuel injection and a decrease in the amount of intake air, similar to the above-mentioned rich spike processing.

Here, note that the amount of hydrogen produced by the NSR catalyst 40 of the first catalyst casing 4 at the time of the execution of the inducement processing changes according to the air fuel ratio of the exhaust gas flowing into the NSR catalyst 40. For example, in the case where the air fuel ratio of the exhaust gas flowing into the NSR catalyst 40 is low, the amount of hydrogen produced by the NSR catalyst 40 becomes larger, in comparison with the case where it is high. Accordingly, in order to produce a sufficient amount of hydrogen in the NSR catalyst 40 at the time of the execution of the inducement processing, it is desirable to make the predetermined rich air fuel ratio as low as possible. However, when the predetermined rich air fuel ratio is made excessively low, the amount of hydrogen production becomes easy to change to a large extent with a slight change of the air fuel ratio. Accordingly, in this embodiment, the predetermined rich air fuel ratio is set to a fixed value (e.g., about 12) in a range in which the amount of hydrogen produced by the NSR catalyst 40 becomes sufficiently large and in which a change in the amount of hydrogen production with respect to a change in the air fuel ratio becomes small, in consideration of the rate of fuel consumption of the internal combustion engine 1, etc.

Here, a specific method for executing the inducement processing will be described in line with a timing chart of FIG. 2. FIG. 2 is a timing chart showing the changes over time of the air fuel ratio (A/F) of the mixture, the measured value Raf1 of the first air fuel ratio sensor 7 and the measured value Raf2 of the second air fuel ratio sensor 8, in the case where the inducement processing is executed. Here, note that the measured values shown in FIG. 2 are the ones when the SCR catalyst 50 is in the undeteriorated or normal state.

In FIG. 2, when the inducement processing is started (t1 in FIG. 2), the air fuel ratio of the mixture (A/F) is changed from the lean air fuel ratio to the predetermined rich air fuel ratio. Due to this change, the air fuel ratio of the exhaust gas flowing into the NSR catalyst 40 of the first catalyst casing 4 also changes from the lean air fuel ratio to the predetermined rich air fuel ratio. When the exhaust gas of the predetermined rich air fuel ratio flows into the NSR catalyst 40 of the first catalyst casing 4, the oxygen stored in the NSR catalyst 40 desorbs from the NSR catalyst 40, so that the air fuel ratio of the exhaust gas flowing out from the NSR catalyst 40 of the first catalyst casing 4 becomes the stoichiometric air fuel ratio which is higher than the predetermined rich air fuel ratio. Accordingly, when oxygen desorbs from the NSR catalyst 40, the measured value Raf1 of the first air fuel ratio sensor 7 and the measured value Raf2 of the second air fuel ratio sensor 8 indicate the stoichiometric air fuel ratio.

Thereafter, when all the oxygen stored in the NSR catalyst 40 has fully desorbed therefrom, the actual air fuel ratio of the exhaust gas flowing out from the NSR catalyst 40 of the first catalyst casing 4 changes from the stoichiometric air fuel ratio to the predetermined rich air fuel ratio (t2 in FIG. 2). However, when all the oxygen has fully desorbed from the first catalyst casing 4, a water gas shift reaction occurs in the NSR catalyst 40. That is, in the NSR catalyst 40 of the first catalyst casing 4, there occurs the reaction of a reducing component (carbon monoxide) produced at the time of the mixture of the predetermined rich air fuel ratio being combusted in the internal combustion engine 1, with the water in the exhaust gas. As a result, hydrogen and carbon dioxide are produced. The hydrogen produced by such a water gas shift reaction arrives at the first air fuel ratio sensor 7, together with the exhaust gas. At that time, because the diffusion rate of the hydrogen is faster than that of any of the other exhaust gas components, most of the surface of a sensor element of the first air fuel ratio sensor 7 is covered with the hydrogen to become a rich atmosphere. As a result, the measured value Raf1 of the first air fuel ratio sensor 7 shifts to an air fuel ratio (shown by a solid line in FIG. 2) which is lower than an actual air fuel ratio (shown by an alternate long and short dash line in FIG. 2). On the other hand, when the hydrogen produced by the water gas shift reaction flows into the SCR catalyst 50 of the second catalyst casing 5, the hydroxide ion (OH) combined with the transition metal of the SCR catalyst 50 reacts with the hydrogen in the exhaust gas to produce water. In other words, the hydrogen produced by the water gas shift reaction is consumed by being converted to water by means of the SCR catalyst 50 of the second catalyst casing 5. As a result, there does not substantially occur a rich shift in the measured value Raf2 of the second air fuel ratio sensor 8. In addition, when the exhaust gas of the predetermined rich air fuel ratio flows into the SCR catalyst 50 of the second catalyst casing 5, oxygen desorbs from the SCR catalyst 50, so that the measured value Raf2 of the second air fuel ratio sensor 8 becomes the stoichiometric air fuel ratio which is higher than the actual air fuel ratio of the exhaust gas flowing into the SCR catalyst 50 of the second catalyst casing 5. Accordingly, between the measured value Raf1 of the first air fuel ratio sensor 7 and the measured value Raf2 of the second air fuel ratio sensor 8, there will also occur a difference resulting from the amount of hydrogen consumed by the SCR catalyst 50 of the second catalyst casing 5, in addition to a difference resulting from the amount of oxygen desorbing from the SCR catalyst 50 of the second catalyst casing 5. Here, note that after all the oxygen stored in the SCR catalyst 50 of the second catalyst casing 5 has desorbed (i.e., after t3 in FIG. 2), hydrogen is produced by the NSR catalyst 40 of the first catalyst casing 4, and the hydrogen thus produced is consumed by the SCR catalyst 50 of the second catalyst casing 5, as a result of which there occurs a sufficient difference between the measured value Raf1 of the first air fuel ratio sensor 7 and the measured value Raf2 of the second air fuel ratio sensor 8. Such a difference continuously occurs until an end time point of the inducement processing (i.e., at t4 in FIG. 2).

Here, when the SCR catalyst 50 has deteriorated at the time of the inducement processing being executed, both of the oxygen storage capacity and the hydrogen consumption capacity of the SCR catalyst 50 will have deteriorated, and hence, in a period of time in which the exhaust gas of a rich air fuel ratio flows into the SCR catalyst 50 of the second catalyst casing 5, in other words, in a period of time in which a water gas shift reaction occurs in the NSR catalyst 40 of the first catalyst casing 4 (i.e., a period of time of t2-t4 in FIG. 2, and hereinafter, referred to as a "reaction occurrence period"), the amount of oxygen desorbing from the SCR catalyst 50 decreases, and the amount of hydrogen consumed in the SCR catalyst 50 also decreases. That is, if the SCR catalyst 50 has deteriorated at the time of the execution of the inducement processing, the total sensor output difference, which is the integrated value of the difference (sensor output difference) between the measured value of the first air fuel ratio sensor 7 and the measured value of the second air fuel ratio sensor 8 in the reaction occurrence period, becomes small due to the synergetic effect of the deterioration of the oxygen storage capacity and the deterioration of the hydrogen consumption capacity of the SCR catalyst 50. In contrast to this, if the SCR catalyst 50 has not deteriorated at the time of the execution of the inducement processing, the total sensor output difference in the reaction occurrence period becomes large due to the synergetic effect of the oxygen storage capacity and the hydrogen consumption capacity of the SCR catalyst 50. Accordingly, a remarkable difference will occur in the total sensor output difference between the case where the SCR catalyst 50 has not deteriorated and the case where the SCR catalyst 50 has deteriorated. Thus, in this embodiment, processing (diagnosis processing) is made in which when the total sensor output difference in the reaction occurrence period is equal to or more than a predetermined threshold value, it is diagnosed that the SCR catalyst 50 has not deteriorated, whereas when the total sensor output difference in the reaction occurrence period is less than the predetermined threshold value, it is diagnosed that the SCR catalyst 50 has deteriorated. The "predetermined threshold value" referred to herein corresponds to a total sensor output difference at the time when the SCR catalyst 50 is on a boundary between undeterioration (normal) and deterioration. Such a predetermined threshold value has been experimentally obtained in advance.

However, in the case where the SCR catalyst 50 of the second catalyst casing 5 is subjected to sulfur poisoning, the amount of hydrogen consumed in the SCR catalyst 50 becomes smaller at the time of the execution of the inducement processing, in comparison with the case where it is not subjected to sulfur poisoning. This is considered because when the SCR catalyst 50 is subjected to sulfur poisoning, the amount of hydroxide ion (OH) combined with the transition metal decreases due to sulfur components being adsorbed to the transition metal of the SCR catalyst 50, so that the amount of hydroxide ion (OH) reacting with hydrogen at the time of the execution of the inducement processing accordingly becomes smaller. In addition, there is also a possibility that in the case where the SCR catalyst 50 of the second catalyst casing 5 is subjected to sulfur poisoning, the amount of oxygen desorbing from the SCR catalyst 50 at the time of the execution of the inducement processing becomes smaller, in comparison with the case where the SCR catalyst 50 is not subjected to sulfur poisoning. Accordingly, when diagnosis processing is executed based on the total sensor output difference at the time of the inducement processing being executed in the state where the SCR catalyst 50 is subjected to sulfur poisoning, a deterioration accompanied by an irreversible degradation of the NOx reduction performance, such as thermal deterioration, aged deterioration, etc., may not be detected with sufficient accuracy.

Here, it is considered that the sulfur poisoning of the SCR catalyst 50 mainly occurs at the time when processing (S purge processing) for eliminating the sulfur poisoning of the NSR catalyst 40 of the first catalyst casing 4 is executed. That is, when the S purge processing of the NSR catalyst 40 is executed, the sulfur components desorbed from the NSR catalyst 40 adsorb to the transition metal of the SCR catalyst 50 which is arranged at the downstream side of the NSR catalyst 40. As a result, the sulfur poisoning of the SCR catalyst 50 is considered to occur. On the other hand, the sulfur components adsorbed to the SCR catalyst 50 desorb from the SCR catalyst 50 under the condition in which oxygen is supplied to the SCR catalyst 50 in a state where the temperature Tscr of the SCR catalyst 50 becomes equal to or higher than a predetermined desorption temperature Tdsp (e.g., 350 degrees C.).

Accordingly, in this embodiment, the execution of the diagnosis processing is inhibited after the S purge processing of the NSR catalyst 40 is terminated until a period of time (a desorption period of time) in which a condition where it is estimated that oxygen is supplied to the SCR catalyst 50 in the state where the temperature of the SCR catalyst 50 becomes equal to or higher than the predetermined desorption temperature Tdsp (hereinafter, referred to as a "desorption condition") is satisfied exceeds a predetermined period of time. Here, note that the "desorption period of time" referred to herein is not limited to a period of time in which the desorption condition has been continuously satisfied, but may be a period of time in which the desorption condition has been intermittently satisfied. As a method of determining whether the desorption period of time exceeds the predetermined period of time, there can be used a method in which a calculation value (an integrated time calculation value) Pdsp correlated with an integrated value of the period of time in which the desorption condition has been satisfied after the end of the S purge processing of the NSR catalyst 40 is calculated, and it is determined whether the calculation value Pdsp of the integrated period of time exceeds a required desorption period of time Pthre. The "required desorption period of time Pthre" referred to herein is a period of time required to eliminate the sulfur poisoning of the SCR catalyst 50 resulting from the S purge processing of the NSR catalyst 40, in a state where the desorption condition is satisfied. Such a required desorption period of time Pthre is correlated with an amount of sulfur components desorbing from the NSR catalyst 40 at the time of the S purge processing of the NSR catalyst 40 being executed. The S purge processing of the NSR catalyst 40 is executed when the amount of sulfur poisoning of the NSR catalyst 40 reaches a predetermined upper limit amount, and hence, it is considered that the amount of sulfur components desorbing from the NSR catalyst 40 at the time of the execution of the S purge processing is substantially equal to the predetermined upper limit amount. Accordingly, it is only necessary to decide the required desorption period of time Pthre, assuming a state where an amount of sulfur components equal to the predetermined upper limit amount has adsorbed to the SCR catalyst 50.

In the following, a procedure of diagnosing the deterioration of the SCR catalyst 50 in this embodiment will be explained along FIGS. 3 and 4. FIG. 3 is a flow chart showing a processing routine which is executed by the ECU 6 at the time of making a deterioration diagnosis of the SCR catalyst 50. The processing routine in FIG. 3 has been beforehand stored in the ROM of the ECU 6, and is executed in a repeated manner by the ECU 6 when the operating state of the internal combustion engine 1 is in the lean operating region.

In the processing routine of FIG. 3, first in the processing of step S101, the ECU 6 determines whether a diagnosis condition is satisfied. The "diagnosis condition" referred to herein is as follows: the operating state of the internal combustion engine 1 is in the lean operating region; the NSR catalyst 40 of the first catalyst casing 4 and the SCR catalyst 50 of the second catalyst casing 5 are activated; and the first air fuel ratio sensor 7 and the second air fuel ratio sensor 8 are normal. Here, note that when the inducement processing is executed in a state where the amount of intake air is relatively small, the period of the execution of the inducement processing may be prolonged. On the other hand, when the inducement processing is executed in a state where the amount of intake air is relatively large, the amount of hydrogen passing through the SCR catalyst 50 may become large. Accordingly, a range of the amount of intake air may have been obtained in advance in which the balance between the length of the execution period of time of the inducement processing and the amount of hydrogen passing through the SCR catalyst 50 becomes optimal, and a condition that an actual amount of intake air (a measured value of the air flow meter 12) falls in that range may be added to the above-mentioned diagnosis condition. In addition, the temperature Tscr of the SCR catalyst 50 may change in the period of execution of the inducement processing, and when a change in the amount of hydrogen consumption with respect to the change in the temperature of the SCR catalyst 50 becomes large, a change in the total sensor output difference resulting from the temperature change may become large. Accordingly, a temperature range may have been obtained in advance in which the change in the amount of hydrogen consumption with respect to the temperature change of the SCR catalyst 50 becomes relatively small, and a condition that the temperature of the SCR catalyst 50 belongs to the temperature range may also be added to the above-mentioned diagnosis condition.

In cases where a negative determination is made in the processing of step S101, the ECU 6 ends the execution of this processing routine. On the other hand, in cases where an affirmative determination is made in the processing of step S101, the routine of the ECU 6 goes to the processing of step S102, where it is determined whether an inhibit flag is off. The inhibit flag is set to "on", when the S purge processing of the NSR catalyst 40 is executed, whereas it is set to "off", when a determination is made that the sulfur poisoning of the SCR catalyst 50 has been eliminated after the end of the S purge processing. The inhibit flag has been set in advance in a predetermined storage area of the backup RAM, or the like.

Here, a procedure of changing the inhibit flag from on to off will be explained along FIG. 4. FIG. 4 is a flow chart showing a processing routine executed by the ECU 6, at the time of determining whether the sulfur poisoning of the SCR catalyst 50 resulting from the S purge processing of the NSR catalyst 40 has been eliminated. The processing routine in FIG. 4 has been beforehand stored in the ROM of the ECU 6, and is executed in a repeated manner during the operation of the internal combustion engine 1.

In the processing routine of FIG. 4, first in the processing of step S201, the ECU 6 determines whether the above-mentioned inhibit flag is on. In cases where a negative determination is made in the processing of step S201, the ECU 6 ends the execution of this processing routine. On the other hand, in cases where an affirmative determination is made in the processing of step S201, the routine of the ECU 6 goes to the processing of step S202.

In the processing of step S202, the ECU 6 determines whether the temperature Tscr of the SCR catalyst 50 is equal to or higher than the above-mentioned desorption temperature Tdsp. The temperature Tscr of the SCR catalyst 50 is estimated from a measured value of the exhaust gas temperature sensor 9. Here, note that in cases where a temperature sensor is mounted on the exhaust pipe 3 at a location between the first catalyst casing 4 and the second catalyst casing 5, the temperature Tscr of the SCR catalyst 50 may be estimated based on a difference between a measured value of this temperature sensor and the measured value of the exhaust gas temperature sensor 9. In cases where an affirmative determination is made in the processing of step S202, the routine of the ECU 6 goes to the processing of step S203.

In the processing of step S203, the ECU 6 determines whether the SCR catalyst 50 is in an oxidizing atmosphere. The "oxidizing atmosphere" referred to herein indicates a state in which it is estimated that oxygen is supplied to the SCR catalyst 50 of the second catalyst casing 5. The state in which it is estimated that oxygen is supplied to the SCR catalyst 50 is a state in which the exhaust gas containing oxygen contributing to the desorption of the sulfur components adsorbed to the SCR catalyst 50 is estimated to flow into the SCR catalyst 50, e.g., a state in which the air fuel ratio of the exhaust gas flowing into the SCR catalyst 50 is estimated to be a lean air fuel ratio higher than the stoichiometric air fuel ratio. Then, as the state in which the air fuel ratio of the exhaust gas flowing into the SCR catalyst 50 is estimated to be the lean air fuel ratio, there is considered a state in which the air fuel ratio of the mixture to be combusted in the internal combustion engine 1 is made to be a lean air fuel ratio, or a state in which fuel cut-off processing to stop the supply of fuel to the internal combustion engine 1 is executed. Accordingly, when the air fuel ratio of the mixture is made to be a lean air fuel ratio, or when the fuel cut-off processing is executed, at the time of this processing routine being executed, a determination should only be made that the SCR catalyst 50 is in the oxidizing atmosphere. Here, note that immediately after the air fuel ratio of the mixture has been shifted from the rich air fuel ratio to the lean air fuel ratio, or immediately after the fuel cut-off processing is started from a state in which the air fuel ratio of the mixture is made to be the rich air fuel ratio, the oxygen in the exhaust gas is stored in the NSR catalyst 40 due to the oxygen storage capacity thereof, whereby the air fuel ratio of the exhaust gas flowing into the SCR catalyst 50 may be made to be the stoichiometric air fuel ratio which is lower than the lean air fuel ratio. For that reason, from the point of view of estimating the state of oxygen being supplied to the SCR catalyst 50 of the second catalyst casing 5 in a more accurate manner, when the air fuel ratio of the exhaust gas measured by the first air fuel ratio sensor 7 is in the state of being the lean air fuel ratio, a determination may be made that the SCR catalyst 50 is in the oxidizing atmosphere, whereas when the air fuel ratio of the exhaust gas measured by the first air fuel ratio sensor 7 is in the state of being the stoichiometric air fuel ratio or the rich air fuel ratio, a determination may be made that the SCR catalyst 50 is not in the oxidizing atmosphere.

Here, in cases where a negative determination is made in the above-mentioned processing of step S202 or S203, it can be assumed that the desorption condition is not satisfied, and so, the ECU 6 ends the execution of this processing routine. On the other hand, in cases where an affirmative determination is made in the processings of steps S202 and S203, it can be assumed that the desorption condition is satisfied, and the routine of the ECU 6 goes to the processing of step S204.

In the processing of step S204, the ECU 6 determines whether the desorption condition was satisfied at the time of the last execution of this processing routine. At that time, a desorption condition flag, which is turned on when an affirmative determination is made in the processing of step S203, whereas it is turned off when a negative determination is made in the processing of step S202 or in the processing of step S203, may have been set in advance in the backup RAM, etc., and the determination in the processing of step S204 may be made based on the desorption condition flag.

In cases where an affirmative determination is made in the processing of step S204, it can be assumed that the desorption condition has been satisfied in a period of time from the last execution to the current execution of this processing routine. Then, the routine of the ECU 6 goes to the processing of step S205, where the integrated time calculation value Pdsp is updated. The integrated time calculation value Pdsp is a calculation value correlated with the integrated value of the period of time in which the desorption condition has been satisfied after the end of the S purge processing of the NSR catalyst 40, as mentioned above. Accordingly, the ECU 6 updates the integrated time calculation value Pdsp, by adding a value corresponding to a period of time (an execution period of this processing routine), which is required from the time of the last execution to the time of the current execution of this processing routine, to the last value of the integrated time calculation value. The routine of the ECU 6 goes to the processing of step S206, after executing the processing of step S205.

In the processing of step S206, the ECU 6 determines whether the integrated time calculation value Pdsp after being updated in the above-mentioned processing of step S205 exceeds the required desorption period of time Pthre. The "required desorption period of time Pthre" is the period of time required to eliminate the sulfur poisoning of the SCR catalyst 50 resulting from the S purge processing of the NSR catalyst 40, under the condition that the desorption condition is satisfied, as mentioned above. Accordingly, in cases where an affirmative determination is made in the processing of step S206 (Pdsp>Pthre), it can be assumed that the sulfur poisoning of the SCR catalyst 50 resulting from the S purge processing of the NSR catalyst 40 has been eliminated. Thus, in cases where an affirmative determination is made in the processing of step S206, the routine of the ECU 6 goes to the processing of step S207, where the inhibit flag is turned off. Subsequently, the routine of the ECU 6 goes to the processing of step S208, where the integrated time calculation value Pdsp is reset to zero. On the other hand, in cases where a negative determination is made in the processing of step S206 (Pdsp≤Pthre), it can be assumed that the sulfur poisoning of the SCR catalyst 50 resulting from the S purge processing of the NSR catalyst 40 has not yet been eliminated. For that reason, in cases where a negative determination is made in the processing of step S206, the ECU 6 terminates the execution of this processing routine, without turning off the inhibit flag.

Here, returning to the processing routine of FIG. 3, in cases where a negative determination is made in the above-mentioned processing of step S102 (i.e., in cases where the inhibit flag is on), the ECU 6 can assume that the sulfur poisoning of the SCR catalyst 50 resulting from the S purge processing of the NSR catalyst 40 has not yet been eliminated, as mentioned above, and hence, the ECU 6 terminates this processing routine, without executing the inducement processing and the diagnosis processing. As a result, in cases where the S purge processing of the NSR catalyst 40 is executed, the execution of the diagnosis processing is inhibited after the S purge processing is terminated until a determination is made that the sulfur poisoning of the SCR catalyst 50 has been eliminated. Accordingly, the diagnosis processing is suppressed from being executed based on the total sensor output difference at the time of the inducement processing being executed in the state where the SCR catalyst 50 is subjected to sulfur poisoning. On the other hand, in cases where an affirmative determination is made in the above-mentioned processing of step S102 (in cases where the inhibit flag is off), it can be assumed that the sulfur poisoning of the SCR catalyst 50 resulting from the S purge processing of the NSR catalyst 40 has already been eliminated, as mentioned above, and hence, the ECU 6 executes the inducement processing and the diagnosis processing in the processing of step S103 and thereafter.

In the processing of S103, the ECU 6 starts the inducement processing. Specifically, the ECU 6 decreases the air fuel ratio of the exhaust gas flowing into the NSR catalyst 40 of the first catalyst casing 4 to the above-mentioned predetermined rich air fuel ratio, by setting the target air fuel ratio of the mixture to be supplied for combustion in the internal combustion engine 1 to the predetermined rich air fuel ratio.

In the processing of step S104, the ECU 6 determines whether the measured value Raf1 of the first air fuel ratio sensor 7 indicates a rich air fuel ratio. In cases where a negative determination is made in the processing of step S104, the atmosphere of the NSR catalyst 40 has not yet become a rich air fuel ratio under the action of the oxygen desorbing from the NSR catalyst 40 of the first catalyst casing 4, and accordingly it can be assumed that a water gas shift reaction has not yet occurred in the NSR catalyst 40 (i.e., a period of time t1-t2 in the above-mentioned FIG. 2). Thus, in cases where a negative determination is made in the processing of step S104, the ECU 6 executes the processing of the step S104 in a repeated manner. On the other hand, in cases where an affirmative determination is made in the processing of step S104, the desorption of oxygen from the NSR catalyst 40 is completed, so that the atmosphere of the NSR catalyst 40 has become a rich air fuel ratio, and accordingly it can be assumed that a water gas shift reaction has occurred in the NSR catalyst 40 (i.e., the above-mentioned reaction occurrence period t2-t4 in FIG. 2). Therefore, in cases where an affirmative determination is made in the processing of step S104, the routine of the ECU 6 goes to the processing of step S105.

In the processing of step S105, the ECU 6 calculates a sensor output difference ΔA/F by subtracting the measured value Raf1 of the first air fuel ratio sensor 7 from the measured value Raf2 of the second air fuel ratio sensor 8.

Subsequently, in the processing of step S106, the ECU 6 calculates an integrated value (total sensor output difference) ΣΔA/F of the sensor output difference ΔA/F in a period of time from the start of the reaction occurrence period to the current point in time. Specifically, the ECU 6 calculates the total sensor output difference ΣΔA/F in the period of time from the start of the reaction occurrence period to the current point in time, by adding the sensor output difference ΔA/F calculated at the time of the current execution of the above-mentioned processing of step S105 to an integrated value ΣΔA/Fold of the sensor output difference ΔA/F in a period of time from the start of the reaction occurrence period to the time of the last execution of the processing of step S106.

In the processing of step S107, by using as a parameter the measured value Raf1 of the first air fuel ratio sensor 7, the ECU 6 estimates an amount of hydrogen (i.e., a reference amount of consumption) Δh2st which is consumed per unit time by the SCR catalyst 50, in the case of assuming that the SCR catalyst 50 is in an undeteriorated state. The reference amount of consumption Δh2st is correlated with the air fuel ratio of the exhaust gas flowing into the SCR catalyst 50 and an amount of a reducing agent contained in the exhaust gas flowing into the SCR catalyst 50. The "reducing agent" referred to herein contains the hydrogen produced in the NSR catalyst 40 of the first catalyst casing 4, in addition to unburnt fuel components such as hydrocarbon, carbon monoxide, etc., contained in the exhaust gas flowing into the second catalyst casing 5. Accordingly, the ECU 6 obtains the flow rate of the exhaust gas by adding the measured value (amount of intake air) of the air flow meter 12 and the amount of fuel injection to each other, and then calculates the amount of the reducing agent contained in the exhaust gas flowing into the SCR catalyst 50 of the second catalyst casing 5 by dividing the flow rate of the exhaust gas by a difference between the measured value Raf1 of the first air fuel ratio sensor 7 and the stoichiometric air fuel ratio. Subsequently, the ECU 6 calculates the reference amount of consumption Δh2st by using, as parameters, the amount of the reducing agent thus obtained and the measured value Raf1 of the first air fuel ratio sensor 7.

In the processing of step S108, the ECU 6 calculates an integrated value (hereinafter, referred to as a "total reference amount of consumption") ΣΔh2st of the reference amount of consumption Δh2st in the period of time from the start of the reaction occurrence period to the current point in time. Specifically, the ECU 6 calculates the total reference amount of consumption ΣΔh2st in the period of time from the start of the reaction occurrence period to the current point in time, by adding the reference amount of consumption Δh2st calculated at the time of the current execution of the above-mentioned processing of step S107 to an integrated value ΣΔh2stold of the reference amount of consumption Δh2st in a period of time from the start of the reaction occurrence period to the time of the last execution of the processing of step S108.

In the processing of step S109, the ECU 6 determines whether the total reference amount of consumption ΣΔh2st calculated in the above-mentioned processing of step S108 is equal to or more than a target amount ThrehThreh22. The "target amount Threh2" referred to herein is an amount at which it is considered that a remarkable difference occurs between a total sensor output difference in the case where the SCR catalyst 50 has not deteriorated and that in the case where the SCR catalyst 50 has deteriorated, and is an amount which has been obtained in advance by means of adaptation processing making use of experiments, etc.

In cases where a negative determination is made in the above-mentioned processing of step S109 (ΣΔh2st<Threh2), a return is made to the processing of step S105, where the inducement processing is continuously executed. On the other hand, in cases where an affirmative determination is made in the above-mentioned processing of step S109 (ΣΔh2st≥Threh2), the routine of the ECU 6 goes to the processing of step S110, where the inducement processing is terminated. In other words, the ECU 6 returns the air fuel ratio of the exhaust gas flowing into the NSR catalyst 40 of the first catalyst casing 4 from the rich air fuel ratio to a lean air fuel ratio which is suitable for the operating condition of the internal combustion engine 1. Thus, when the end time of the inducement processing is adjusted based on the total reference amount of consumption ΣΔh2st, even if a variation in the air fuel ratio of the exhaust gas flowing into the second catalyst casing 5 occurs at the time of the execution of the inducement processing, a total amount of the hydrogen consumed in the SCR catalyst 50 during the reaction occurrence period can be made substantially constant, unless the deterioration state of the SCR catalyst 50 changes to a large extent. Consequently, the variation in the total sensor output difference ΣΔA/F resulting from the variation in the air fuel ratio of the exhaust gas flowing into the second catalyst casing 5 is alleviated or reduced, so that the deterioration state of the SCR catalyst 50 comes to be reflected on the total sensor output difference ΣΔA/F in an accurate manner. As a result, it becomes possible to diagnose the deterioration state of the SCR catalyst 50 based on the total sensor output difference ΣΔA/F in an accurate manner.

When finishing the execution of the above-mentioned processing of step S110, the ECU 6 executes the diagnosis processing in the processing of step S111 and thereafter. Specifically, first in the processing of step S111, the ECU 6 determines whether the total sensor output difference ΣΔA/F calculated in the above-mentioned processing of step S106 is equal to or larger than a predetermined threshold value Threa/f. The "predetermined threshold value Threa/f" referred to herein is a value at which it can be assumed that when the total sensor output difference ΣΔA/F in the reaction occurrence period is less than the predetermined threshold value Threa/f, in the case where the inducement processing has been executed over a period of time in which the total reference amount of consumption ΣΔh2st becomes equal to or more than the target amount Threh2, the NOx reduction performance of the SCR catalyst 50 has deteriorated. The "predetermined threshold value Threa/f" is also a value which has been obtained in advance by adaptation processing making use of experiments, etc.

In cases where an affirmative determination is made in the above-mentioned processing of step S111 (ΣΔA/F≥Threa/f), the routine of the ECU 6 goes to the processing of step S112, where the ECU 6 makes a determination that the SCR catalyst 50 of the second catalyst casing 5 has not deteriorated (normal). On the other hand, in cases where a negative determination is made in the processing of step S111 (ΣΔA/F<Threa/f), the routine of the ECU 6 goes to the processing of step S113, where a determination is made that the SCR catalyst 50 of the second catalyst casing 5 has deteriorated. In that case, the ECU 6 may prompt to repair the second catalyst casing 5 by making use of an alarm lamp, a display unit, or the like, which is arranged in a passenger compartment of the vehicle. After finishing the execution of the processing of step S112 or S113, the routine of the ECU 6 goes to the processing of step S114, and resets the values of the total sensor output difference ΣΔA/F and the total reference amount of consumption ΣΔh2st to zero, and ends the execution of this processing routine.

As described above, by executing the processing routines of FIG. 3 and FIG. 4 by means of the ECU 6, the execution of the diagnosis processing is inhibited, when the sulfur poisoning of the SCR catalyst 50 resulting from the S purge processing of the NSR catalyst 40 has not been eliminated. Accordingly, the diagnosis processing is executed based on the total sensor output difference ΣΔA/F at the time of the inducement processing being executed in the state where the SCR catalyst 50 is not subjected to sulfur poisoning, and hence, it is possible to suppress a decrease in diagnostic accuracy resulting from the sulfur poisoning of the SCR catalyst 50.

Here, note that in this embodiment, there has been described an example in which when the SCR catalyst 50 is in the state of being subjected to the sulfur poisoning resulting from the S purge processing of the NSR catalyst 40, the execution of the diagnosis processing is inhibited by turning on the inhibit flag. On the other hand, by adding, as one of the diagnosis condition, a condition that the SCR catalyst 50 is not subjected to sulfur poisoning, the diagnosis processing may not be executed, when the SCR catalyst 50 is subjected to sulfur poisoning resulting from the S purge processing of the NSR catalyst 40.

In addition, in the processing routine of FIG. 3, reference has been made to an example in which the end time of the inducement processing is determined based on the total reference amount of assumption ΣΔh2st, but the end time of the inducement processing may be decided based on an amount of reducing agent supplied to the SCR catalyst 50 of the second catalyst casing 5 during the period of the execution of the inducement processing.

<Modification 1 of Embodiment 1>

In the state where the desorption condition is satisfied, an amount of sulfur components desorbing per unit time from the SCR catalyst 50 (hereinafter, referred to as an "instantaneous amount of desorption") is correlated with the temperature Tscr of the SCR catalyst 50. FIG. 5 is a view showing the correlation between the temperature Tscr of the SCR catalyst 50 and the concentration (S concentration) of sulfur components (e.g., sulfur dioxide ($SO_2$)) contained in the exhaust gas flowing out from the SCR catalyst 50, in the case where the desorption condition is satisfied. Here, note that a graph in FIG. 5 is an approximate curve with the result of the S concentration plotted at each temperature under the same conditions other than the temperature of the SCR catalyst 50. In addition, T1 in FIG. 5 corresponds to the afore-mentioned desorption temperature Tdsp, and T4 in FIG. 5 indicates a maximum temperature that the temperature Tscr of the SCR catalyst 50 can take during the operation of the internal combustion engine 1. As shown in FIG. 5, when the temperature Tscr of the SCR catalyst 50 falls within a temperature range of T1-T2 (first temperature range) in FIG. 5, the S concentration becomes larger in comparison with the time when the temperature Tscr of the SCR catalyst 50 falls within a second temperature range (a temperature range of T2-T3 in FIG. 5) which is higher than the first temperature range. Moreover, when the temperature Tscr of the SCR catalyst 50 falls within a third temperature range (a temperature range of T3-T4 in FIG. 5) which is higher than the second temperature range, the S concentration becomes larger in comparison with the time when the temperature Tscr of the SCR catalyst 50 falls within the first temperature range or the second temperature range.

When based on the correlation as shown in FIG. 5, it can be the that the sulfur components adsorbed to the SCR catalyst 50 tends to desorb more easily in the case where the temperature Tscr of the SCR catalyst 50 falls within the first temperature range or the third temperature range than in the case where it falls within the second temperature range, and furthermore, the sulfur components adsorbed to the SCR catalyst 50 tends to desorb more easily in the case where the temperature Tscr of the SCR catalyst 50 falls within the third temperature range than in the case where it falls within the first temperature range. Accordingly, it is considered that an instantaneous amount of desorption Ams at the time of the temperature Tscr of the SCR catalyst 50 being equal to or higher than the desorption temperature Tdsp becomes larger in the case where the temperature Tscr of the SCR catalyst 50 falls within the first temperature range or the third temperature range than in the case where it falls within the second temperature range, and furthermore, the instantaneous amount of desorption Ams becomes larger in the case where the temperature Tscr of the SCR catalyst 50 falls within the third temperature range than in the case where it falls within the first temperature range.

Accordingly, in cases where the desorption condition is satisfied, when the temperature Tscr of the SCR catalyst 50 falls within the first temperature range or the third temperature range, the ECU 6 may make larger an amount of update per time of the integrated time calculation value Pdsp in comparison with the time when the temperature Tscr of the SCR catalyst 50 falls within the second temperature range, and furthermore, when the temperature Tscr of the SCR catalyst 50 falls within the third temperature range, the ECU 6 may make larger the amount of update per time of the integrated time calculation value Pdsp in comparison with the time when the temperature Tscr of the SCR catalyst 50 falls within the first temperature range.

Here, a procedure of changing the inhibit flag from on to off will be explained along FIG. 6. In FIG. 6, the same symbols are attached to the same processings as those in the above-mentioned processing routine of FIG. 4. In the processing routine of FIG. 6, the processings of steps S2051-S2055 are executed, instead of the processing of step S205 in the above-mentioned processing routine of FIG. 4.

In the processing of step S2051, the ECU 6 determines whether the temperature Tscr of the SCR catalyst 50 falls within the above-mentioned first temperature range. In cases where an affirmative determination is made in the processing of step S2051, the routine of the ECU 6 goes to the processing of step S2052, where a new integrated time calculation value Pdsp (=Pdspold+a1) is calculated, by adding a first amount of update a1 to the last value Pdspold of the integrated time calculation value. On the other hand, in cases where a negative determination is made in the processing of step S2051, the routine of the ECU 6 goes to the processing of step S2053.

In the processing of step S2053, the ECU 6 determines whether the temperature Tscr of the SCR catalyst 50 falls within the above-mentioned second temperature range. In cases where an affirmative determination is made in the processing of step S2053, the routine of the ECU 6 goes to the processing of step S2054, where a new integrated time calculation value Pdsp (=Pdspold+a2) is calculated, by adding a second amount of update a2 smaller than the first amount of update a1 to the last value Pdspold of the integrated time calculation value. On the other hand, in cases where a negative determination is made in the processing of step S2053, the temperature Tscr of the SCR catalyst 50 comes to fall within the above-mentioned third temperature range, and so, the routine of the ECU 6 goes to the processing of step S2055.

In the processing of step S2055, the ECU 6 calculates a new integrated time calculation value Pdsp (=Pdspold+a3), by adding a third amount of update a3 larger than the first amount of update a1 to the last value Pdspold of the integrated time calculation value.

According to the above-mentioned procedure, when the temperature Tscr of the SCR catalyst 50 falls within a temperature range in which the instantaneous amount of desorption becomes relatively large, among the above-mentioned three temperature ranges, the amount of update per time of the integrated time calculation value Pdsp is also made relatively large. As a result, it becomes possible to determine the time when the sulfur poisoning of the SCR catalyst 50 resulting from the S purge processing is eliminated in a more accurate manner, after the end of the S purge processing of the NSR catalyst 40. For that reason, the diagnosis processing is suppressed more reliably from being executed based on the total sensor output difference at the time of the inducement processing being executed in the state where the SCR catalyst 50 is subjected to sulfur poisoning. Accordingly, it is possible to suppress a decrease in diagnostic accuracy resulting from the sulfur poisoning of the SCR catalyst 50 in a more reliable manner.

<Modification 2 of Embodiment 1>

The instantaneous amount of desorption in the state where the desorption condition is satisfied is also correlated with the temperature Tscrp of the SCR catalyst 50 at the time of the purge processing of the NSR catalyst 40 being executed, in addition to the temperature Tscr of the SCR catalyst 50 in the state where the desorption condition is satisfied. For example, as shown in FIG. 7, the instantaneous amount of desorption Ams becomes larger in the case where the temperature Tscrp of the SCR catalyst 50 at the time of the purge processing of the NSR catalyst 40 being executed is high than in the case where it is low. Accordingly, the amount of update per time of the integrated time calculation value Pdsp may be changed based on the correlation of FIG. 7, instead of the above-mentioned correlation of FIG. 5. Specifically, in addition to changing the amount of update per time of the integrated time calculation value Pdsp based on the temperature Tscr of the SCR catalyst 50 in the state where the desorption condition is satisfied, the ECU 6 may make larger the amount of update per time of the integrated time calculation value Pdsp in the case where the temperature Tscrp of the SCR catalyst 50 at the time of the execution of the S purge processing of the NSR catalyst 40 is low, in comparison with the case where it is high. According to such a method, it is possible to determine the time when the sulfur poisoning of the SCR catalyst 50 resulting from the S purge processing of the NSR catalyst 40 has been eliminated in a more accurate manner.

Here, note that in the above-mentioned first and second modifications of the first embodiment, there has been shown by way of example a method of changing the amount of update per time of the integrated time calculation value Pdsp, according to the temperature Tscr of the SCR catalyst 50 in the state where the desorption condition is satisfied, or the temperature Tscrp of the SCR catalyst 50 at the time of the S purge processing of the NSR catalyst 40 being executed, but there may be used a method of correcting the required desorption period of time Pthre, according to the temperature Tscr of the SCR catalyst 50 in the state where the desorption condition is satisfied, or the temperature Tscrp of the SCR catalyst 50 at the time of the S purge processing of the NSR catalyst 40 being executed. For example, in the state where the desorption condition is satisfied, when the temperature Tscr of the SCR catalyst 50 falls within the second temperature range, the required desorption period of time Pthre may not be corrected, whereas when the temperature Tscr of the SCR catalyst 50 falls within the first temperature range or the third temperature range, the required desorption period of time Pthre may be corrected to become shorter, as the period of time, in which the temperature Tscr of the SCR catalyst 50 falls within the first temperature range or the third temperature range, becomes longer. In this case, when the temperature Tscr of the SCR catalyst 50 falls within the third temperature range, an amount of correction at the time of shortening the required desorption period of time Pthre is made larger in comparison with the time when the temperature Tscr of the SCR catalyst 50 falls within the first temperature range. In addition, the required desorption period of time Pthre may be corrected to become shorter in the case where the temperature Tscrp of the SCR catalyst 50 at the time of the execution of the S purge processing of the NSR catalyst 40 is low, in comparison with the case where it is high. A mode in which the required desorption period of time Pthre is corrected by these methods is substantially included in the technical idea of inhibiting the execution of diagnosis processing until the desorption period of time exceeds the predetermined period of time.

Embodiment 2

Next, reference will be made to a second embodiment of the present disclosure based on FIGS. 8 and 9. Here, a difference of the second embodiment from the above-mentioned first embodiment will be described, and an explanation of the same will be omitted.

The difference between the above-mentioned first embodiment and this second embodiment is in a method of determining whether the period of time (the desorption period of time) in which the above-mentioned desorption condition has been satisfied after the end of the S purge processing of the NSR catalyst 40 exceeded the above-mentioned predetermined period of time. That is, in the above-mentioned first embodiment, there has been described an example in which the above-mentioned determination is executed by using the integrated time calculation value Pdsp as a parameter. On the other hand, in this second embodiment, there will be described an example in which in the state where the desorption condition is satisfied, a physical quantity correlated with the amount of sulfur components desorbing per unit time from the SCR catalyst 50 (an instantaneous desorption amount correlation value) is integrated, and the above-mentioned determination is executed by using the integrated value thus obtained as a parameter. Here, note that in this second embodiment, there will be described an example which uses, as the above-mentioned instantaneous desorption amount correlation value, the amount of sulfur components (the instantaneous amount of desorption) Ams desorbing per unit time from the SCR catalyst 50 in the state where the desorption condition is satisfied.

Here, in this second embodiment, a procedure of changing the inhibit flag from on to off will be explained along FIG. 8. FIG. 8 is a flow chart showing a processing routine executed by the ECU 6, at the time of determining whether the sulfur poisoning of the SCR catalyst 50 resulting from the S purge processing of the NSR catalyst 40 has been eliminated. In FIG. 8, the same symbols are attached to the same processings as those in the above-mentioned processing routine of FIG. 4.

In the processing routine of FIG. 8, the processings of steps S301 through S303 are executed, instead of the processings of steps S204 through S206 in the processing routine of FIG. 4, and the processing of step S304 is executed, instead of the processing of step S208 in the processing routine of FIG. 4. First, in cases where an affirmative determination is made in the processings of steps S202 and S203, the ECU 6 executes processing of S301 (i.e., in cases where a determination is made that it is during the desorption period of time). In the processing of step S301, the ECU 6 calculates the instantaneous amount of desorption Ams. The instantaneous amount of desorption Ams is correlated with an amount of oxygen supplied per unit time to the SCR catalyst 50 (hereinafter, referred to as an "instantaneous amount of supply Ao2") and the temperature Tscr of the SCR catalyst 50. Here, the correlation between the instantaneous amount of supply Ao2 and the instantaneous amount of desorption Ams in the case where the temperature Tscr of the SCR catalyst 50 is equal to or higher than the above-mentioned desorption temperature Tdsp is shown in FIG. 9. As shown in FIG. 9, the instantaneous amount of desorption Ams in the case where the temperature Tscr of the SCR catalyst 50 is equal to or higher than the desorption temperature Tdsp becomes larger when the instantaneous amount of supply Ao2 is large than when it is small. However, when the instantaneous amount of supply Ao2 becomes large to some extent, the instantaneous amount of desorption Ams becomes substantially constant. In addition, it is considered that as shown in the above-mentioned FIG. 5, the instantaneous amount of desorption Ams in the state where the desorption condition is satisfied becomes larger in the case where the temperature Tscr of the SCR catalyst 50 falls within the first temperature range or the third temperature range than in the case where it falls within the second temperature range, and furthermore, the instantaneous amount of desorption Ams becomes larger in the case where the temperature Tscr of the SCR catalyst 50 falls within the third temperature range than in the case where it falls within the first temperature range. Accordingly, in the processing of step S301, the ECU 6 calculates the instantaneous amount of desorption Ams based on the correlations of FIG. 5 and FIG. 9. In that case, the instantaneous amount of supply Ao2 is to be calculated from the measured value Raf1 of the first air fuel ratio sensor 7 and the flow rate of the exhaust gas.

The routine of the ECU 6 goes to the processing of step S302, after executing the above-mentioned processing of step S301. In the processing of step S302, the ECU 6 calculates a total amount ΣAms of the sulfur components (hereinafter, referred to as a "total amount of desorption") which have desorbed from the SCR catalyst 50 in a period of time from the end of the S purge processing of the NSR catalyst 40 to the current point in time. Specifically, the ECU 6 calculates the total amount of desorption ΣAms in the period of time from the end of the S purge processing of the NSR catalyst 40 to the current point in time, by adding the instantaneous amount of desorption Ams calculated at the time of the current execution of the above-mentioned processing of step S301 to an integrated value ΣAmsold of the instantaneous amount of desorption Ams in a period of time from the end of the S purge processing of the NSR catalyst 40 to the time of the last execution of the processing of step S302.

After executing the above-mentioned processing of step S302, the routine of the ECU 6 goes to the processing of step S303, where it is determined whether the total amount of desorption ΣAms calculated in the above-mentioned processing of step S302 has exceeded a predetermined amount of desorption Athre. The "predetermined amount of desorption Athre" referred to herein is an amount of sulfur components estimated to be adsorbed to the SCR catalyst 50 at the time of the S purge processing of the NSR catalyst 40 being executed. The amount of sulfur components estimated to be adsorbed to the SCR catalyst 50 at the time of the execution of the S purge processing of the NSR catalyst 40 is substantially equal to the amount of sulfur components desorbing from the NSR catalyst 40 at the time of the execution of the S purge processing of the NSR catalyst 40, i.e., the above-mentioned predetermined upper limit amount. Accordingly, the above-mentioned predetermined amount of desorption Athre need only be set to the same amount as the above-mentioned predetermined upper limit amount.

In cases where an affirmative determination is made in the above-mentioned processing of step S303 (ΣAms>Athre), it can be assumed that the sulfur poisoning of the SCR catalyst 50 resulting from the S purge processing of the NSR catalyst 40 has already been eliminated. In other words, in cases where an affirmative determination is made in the processing of step S303, it can be assumed that the desorption period of time has exceeded the predetermined period of time. Accordingly, the routine of the ECU 6 goes to the processing of step S207 and turns off the inhibit flag. Subsequently, the routine of the ECU 6 goes to the processing of step S304, where the total amount of adsorption ΣAms is reset to zero.

On the other hand, in cases where a negative determination is made in the above-mentioned processing of step S303 (ΣAms≤Athre), it can be assumed that the sulfur poisoning of the SCR catalyst 50 resulting from the S purge processing of the NSR catalyst 40 has not yet been eliminated. In other words, in cases where a negative determination is made in the processing of step S303, it can be assumed that the desorption period of time has not exceeded the predetermined period of time. Accordingly, the ECU 6 ends the execution of this processing routine.

According to the above-mentioned procedure, it is possible to determine the time when the sulfur poisoning of the SCR catalyst 50 resulting from the S purge processing of the NSR catalyst 40 is eliminated, in a more accurate manner, so that the diagnosis processing is more reliably suppressed from being executed based on the total sensor output difference at the time of the inducement processing being executed in the state where the SCR catalyst 50 is subjected to sulfur poisoning. As a result, it is possible to suppress a decrease in diagnostic accuracy resulting from the sulfur poisoning of the SCR catalyst 50 in a more reliable manner. In addition, in the procedure described in the above-mentioned first embodiment, from the point of view of suppressing the decrease in diagnostic accuracy resulting from the sulfur poisoning of the SCR catalyst 50, there can also be considered a method of setting the required desorption period of time Pthre longer. On the other hand, according to the procedure of this second embodiment, it is possible to detect accurately and at an early stage that the sulfur poisoning of the SCR catalyst 50 has been eliminated, and hence, there is also a merit that the deterioration diagnosis of the SCR catalyst 50 can be executed at an earlier stage.

Here, note that in this second embodiment, reference has been made to an example in which the instantaneous amount of desorption Ams is used as the instantaneous desorption amount correlation value, but when based on the correlation as shown in FIG. 9, there may be used the instantaneous amount of supply Ao2. In that case, on condition that an integrated value of the instantaneous amount of supply Ao2 has exceeded a predetermined amount of supply, a determination may be made that the desorption period of time has exceeded the predetermined period of time. In addition, when based on the correlation shown in FIG. 5 or FIG. 7, it is considered that the amount of oxygen contributing to the desorption of the sulfur components adsorbed to the SCR catalyst 50 among the instantaneous amount of supply Ao2 becomes larger in the case where the temperature Tscr of the SCR catalyst 50 falls within the first temperature range or the third temperature range than in the case where it falls within the second temperature range, and furthermore, the amount of oxygen contributing to the desorption of the sulfur components from the SCR catalyst 50 among the instantaneous amount of supply Ao2 becomes larger in the case where the temperature Tscr of the SCR catalyst 50 falls within the third temperature range than in the case where it falls within the first temperature range. Accordingly, based on such a characteristic, there may be estimated the amount of oxygen contributing to the desorption of the sulfur components from the SCR catalyst 50 among the instantaneous amount of supply Ao2, and on condition that the integrated value of the estimated value has exceeded the predetermined amount of supply, the determination may be made that the desorption period of time has exceeded the predetermined period of time.

<Modification of Embodiment 2>

The instantaneous amount of desorption Ams in the state where the above-mentioned desorption condition is satisfied is also correlated with the temperature Tscrp of the SCR catalyst 50 at the time of the purge processing of the NSR catalyst 40 being executed, in addition to the temperature Tscr of the SCR catalyst 50 in the state where the desorption condition is satisfied, as shown in the above-mentioned FIG. 7. That is, the instantaneous amount of desorption Ams becomes larger in the case where the temperature Tscrp of the SCR catalyst 50 at the time of the purge processing of the NSR catalyst 40 being executed is high than in the case where it is low. Accordingly, in this modification, the instantaneous amount of desorption Ams may be estimated by using the correlation of FIG. 7, instead of the correlation of FIG. 5. That is, in this modification, the instantaneous amount of desorption Ams may be estimated based on the above-mentioned correlation of FIG. 7 and the correlation of FIG. 9. According to such a method, it is possible to determine the time when the sulfur poisoning of the SCR catalyst 50 resulting from the S purge processing of the NSR catalyst 40 has been eliminated in a more accurate manner.

In the above-mentioned second embodiment and the modification thereof, there has been shown by way of example a method of changing the instantaneous amount of desorption Ams, according to the temperature Tscr of the SCR catalyst 50 in the state where the desorption condition is satisfied, or the temperature Tscrp of the SCR catalyst 50 at the time of the S purge processing of the NSR catalyst 40 being executed, but there may be used a method of correcting the predetermined amount of desorption Athre, according to the temperature Tscr of the SCR catalyst 50 in the state where the desorption condition is satisfied, or the temperature Tscrp of the SCR catalyst 50 at the time of the S purge processing of the NSR catalyst 40 being executed. For example, in the state where the desorption condition is satisfied, when the temperature Tscr of the SCR catalyst 50 falls within the second temperature range, the predetermined amount of desorption Athre may not be corrected, whereas when the temperature Tscr of the SCR catalyst 50 falls within the first temperature range or the third temperature range, the predetermined amount of desorption Athre may be corrected to become smaller, as the period of time, in which the temperature Tscr of the SCR catalyst 50 falls within the first temperature range or the third temperature range, becomes longer. In this case, when the temperature Tscr of the SCR catalyst 50 falls within the third temperature range, an amount of correction at the time of making smaller the predetermined amount of desorption Athre is made larger in comparison with the time when the temperature Tscr of the SCR catalyst 50 falls within the first temperature range. In addition, the predetermined amount of desorption Athre may be corrected to become smaller in the case where the temperature Tscrp of the SCR catalyst 50 at the time of the execution of the S purge processing of the NSR catalyst 40 is low in comparison with the case where it is high. A mode in which the predetermined amount of desorption Athre is corrected by these methods is substantially included in the technical idea of inhibiting the execution of diagnosis processing until the desorption period of time exceeds the predetermined period of time.

Other Embodiments

Here, note that in the above-mentioned first and second embodiments, there have been described examples in which the execution of the inducement processing is also inhibited in addition to the execution of the diagnosis processing, in the period of time after the S purge processing of the NSR catalyst 40 received in the first catalyst casing 4 is terminated until the sulfur poisoning of the SCR catalyst 50 resulting from the S purge processing is eliminated, but as long as the execution of the diagnosis processing is finally inhibited, previous processing such as the inducement processing, etc., may be executed as appropriate.

In addition, in the above-mentioned first and second embodiments, there has been described examples in which the execution of the diagnosis processing is inhibited in the period of time after the S purge processing of the NSR catalyst 40 received in the first catalyst casing 4 is terminated until the sulfur poisoning of the SCR catalyst 50 resulting from the S purge processing is eliminated, but it is also desirable to inhibit the execution of the diagnosis processing during the execution of the S purge processing, in addition to that period of time. This is because during the execution of the S purge processing, the sulfur poisoning of the SCR catalyst 50 progresses due to the sulfur components desorbing from the NSR catalyst 40, so that when the diagnosis processing is executed based on the total sensor output difference at the time of the execution of the inducement processing in such a condition, diagnostic accuracy becomes low.

Moreover, in the above-mentioned first and second embodiments, there have been described examples in which the NSR catalyst 40 is received in the first catalyst casing 4, but even in cases where a three-way catalyst is received in the first catalyst casing 4, the deterioration diagnosis of the SCR catalyst 50 can be executed according to the same or similar procedure. In other words, with an arrangement in which a catalyst (pre-stage catalyst) for promoting a water gas shift reaction at the time of the air fuel ratio of exhaust gas becoming a rich air fuel ratio is arranged in the exhaust pipe 3 at the upstream side of the first air fuel ratio sensor 7, the deterioration diagnosis of the SCR catalyst 50 can be executed according to the procedures described in the above-mentioned first and second embodiments.

Further, in an arrangement in which a catalyst casing with a three-way catalyst received therein is arranged at the upstream side of the first catalyst casing 4 with the NSR catalyst 40 received therein, too, the deterioration diagnosis of the SCR catalyst 50 can be executed according to the same or similar procedure. In the arrangement that the catalyst casing with the three-way catalyst received therein is arranged at the upstream side of the first catalyst casing 4, hydrogen is produced by the three-way catalyst of the catalyst casing arranged at the upstream of the first catalyst casing 4, too, in addition to the NSR catalyst 40 of the first catalyst casing 4, at the time of the execution of the inducement processing, as a consequence of which a difference between a total sensor output difference in the case where the SCR catalyst 50 of the second catalyst casing 5 has deteriorated and a total sensor output difference in the case where the SCR catalyst 50 of the second catalyst casing 5 has not deteriorated can be enlarged further. As a result, the deterioration diagnosis of the SCR catalyst 50 can be executed with a higher degree of accuracy.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-243551, filed on Dec. 14, 2015, which is hereby incorporated by reference herein in its entirety.

What is claimed is:

1. A deterioration diagnosis apparatus for a selective catalytic reduction catalyst, which is applied to an exhaust gas purification system including:

a pre-stage catalyst that is arranged in an exhaust passage of an internal combustion engine which is able to be operated in a lean burn state, and that is configured to generate a water gas shift reaction by making use of a reducing agent produced at the time of a mixture being combusted, when an air fuel ratio of the mixture is a predetermined rich air fuel ratio which is lower than a stoichiometric air fuel ratio;

a selective catalytic reduction catalyst that is arranged in the exhaust passage at a location downstream of the pre-stage catalyst, and configured to have a function to store oxygen in exhaust gas when an air fuel ratio of the exhaust gas is a lean air fuel ratio higher than the stoichiometric air fuel ratio, but to desorb the oxygen thus stored when the air fuel ratio of the exhaust gas is equal to or lower than the stoichiometric air fuel ratio;

a first air fuel ratio sensor that is arranged in the exhaust passage at a location between the pre-stage catalyst and the selective catalytic reduction catalyst, and that is configured to measure a physical quantity correlated with an air fuel ratio of exhaust gas flowing into the selective catalytic reduction catalyst; and a second air fuel ratio sensor that is arranged in the exhaust passage at a location downstream of the selective catalytic reduction catalyst, and that is configured to measure a physical quantity correlated with an air fuel ratio of exhaust gas flowing out from the selective catalytic reduction catalyst;

the deterioration diagnosis apparatus comprising:

a controller that is configured to execute an inducement processing, which is to induce a water gas shift reaction in the pre-stage catalyst, by controlling an operating state of the internal combustion engine so that the air fuel ratio of the mixture is changed to the predetermined rich air fuel ratio, when the air fuel ratio of the mixture is the lean air fuel ratio, and to execute a diagnosis processing, which is to diagnose deterioration of the selective catalytic reduction catalyst based on a total sensor output difference which is an integrated value of a difference between a measured value of the first air fuel ratio sensor and a measured value of the second air fuel ratio sensor in a period of time in which the water gas shift reaction occurs in the pre-stage catalyst by the execution of the inducement processing;

wherein the controller inhibits the execution of the diagnosis processing in a period of time from when S purge processing, which is to eliminate sulfur poisoning of the pre-stage catalyst, is terminated, until a desorption period of time, which is a period of time in which oxygen is estimated to be supplied to the selective catalytic reduction catalyst in a state where the temperature of the selective catalytic reduction catalyst becomes equal to or higher than a desorption temperature which is a temperature at which sulfur components desorb from the selective catalytic reduction catalyst, exceeds a predetermined period of time.

2. The deterioration diagnosis apparatus for a selective catalytic reduction catalyst according to claim 1, wherein the controller calculates an integrated time calculation value correlated with an integrated value of a period of time in which a condition is satisfied under which after the end of the S purge processing, oxygen is estimated to be supplied to the selective catalytic reduction catalyst in the state where the temperature of the selective catalytic reduction catalyst becomes equal to or higher than the desorption temperature which is the temperature at which sulfur components desorb from the selective catalytic reduction catalyst, and makes a determination that the desorption period of time has exceeded the predetermined period of time, when the integrated time calculation value thus obtained has exceeded a required desorption period of time.

3. The deterioration diagnosis apparatus for a selective catalytic reduction catalyst according to claim 2, wherein a first temperature range, a second temperature range higher than the first temperature range, and a third temperature range higher than the second temperature range are included in a temperature region which is equal to or higher than the desorption temperature, wherein, in the desorption period of time, when the temperature of the selective catalytic reduction catalyst falls within the first temperature range or the third temperature range, the controller makes larger an amount of update per time of the integrated time calculation value in comparison with the time when the temperature of the selective catalytic reduction catalyst falls within the second temperature range.

4. The deterioration diagnosis apparatus for a selective catalytic reduction catalyst according to claim 2, wherein the controller makes larger an amount of update per time of the integrated time calculation value in the case where the temperature of the selective catalytic reduction catalyst at the time of the execution of the S purge processing is low, in comparison with the case where it is high.

5. The deterioration diagnosis apparatus for a selective catalytic reduction catalyst according to claim 3, wherein the controller makes larger an amount of update per time of the integrated time calculation value in the case where the temperature of the selective catalytic reduction catalyst at the time of the execution of the S purge processing is low, in comparison with the case where it is high.

6. The deterioration diagnosis apparatus for a selective catalytic reduction catalyst according to claim 1, wherein the controller calculates an instantaneous desorption amount correlation value which is a physical quantity correlated with an amount of sulfur components desorbing per unit time from the selective catalytic reduction catalyst, by using, as a parameter, an amount of oxygen supplied to the selective catalytic reduction catalyst in the desorption period of time, and makes a determination that the desorption period of time has exceeded the predetermined period of time, when an integrated value of the instantaneous desorption amount correlation value has exceeded a predetermined amount of desorption.

7. The deterioration diagnosis apparatus for a selective catalytic reduction catalyst according to claim 6, wherein a first temperature range, a second temperature range higher than the first temperature range, and a third temperature range higher than the second temperature range are included in a temperature region which is equal to or higher than the desorption temperature; and wherein, in the desorption period of time, when the temperature of the selective catalytic reduction catalyst falls within the first temperature range or the third temperature range, the controller makes larger the instantaneous desorption amount correlation value in comparison with the time when the temperature of the selective catalytic reduction catalyst falls within the second temperature range.

8. The deterioration diagnosis apparatus for a selective catalytic reduction catalyst according to claim 6, wherein the controller makes larger the instantaneous desorption amount correlation value in the case where the temperature of the selective catalytic reduction catalyst at the time of the execution of the S purge processing is low, in comparison with the case where it is high.

9. The deterioration diagnosis apparatus for a selective catalytic reduction catalyst according to claim 7, wherein the controller makes larger the instantaneous desorption amount correlation value in the case where the temperature of the selective catalytic reduction catalyst at the time of the execution of the S purge processing is low, in comparison with the case where it is high.

* * * * *